US009778859B2

(12) United States Patent
Vucinic et al.

(10) Patent No.: US 9,778,859 B2
(45) Date of Patent: Oct. 3, 2017

(54) DOORLESS PROTOCOL HAVING MULTIPLE QUEUE READ REQUESTS IN FLIGHT

(71) Applicant: Western Digital Technologies, Inc., Irvine, CA (US)

(72) Inventors: Dejan Vucinic, San Jose, CA (US); Zvonimir Z. Bandic, San Jose, CA (US); Cyril Guyot, San Jose, CA (US); Robert Mateescu, San Jose, CA (US); Qingbo Wang, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 402 days.

(21) Appl. No.: 14/631,187

(22) Filed: Feb. 25, 2015

(65) Prior Publication Data

US 2015/0177994 A1    Jun. 25, 2015

Related U.S. Application Data

(63) Continuation-in-part of application No. 14/489,994, filed on Sep. 18, 2014, now Pat. No. 9,652,199, which
(Continued)

(51) Int. Cl.
*G06F 3/06* (2006.01)
*G06F 12/08* (2016.01)

(52) U.S. Cl.
CPC .......... *G06F 3/0613* (2013.01); *G06F 3/0659* (2013.01); *G06F 3/0661* (2013.01);
(Continued)

(58) Field of Classification Search
CPC .... G06F 3/0613; G06F 3/0659; G06F 3/0661; G06F 3/0679; G06F 12/08; G06F 9/45;
(Continued)

(56) References Cited

U.S. PATENT DOCUMENTS 5,854,908 A   12/1998 Ogilvie et al.
5,978,858 A   11/1999 Bonola et al.
(Continued)

FOREIGN PATENT DOCUMENTS

WO   WO-2013028827   2/2013

OTHER PUBLICATIONS

Caulfield, A.M. et al., "Providing Safe, User Space Access to Fast, Solid State Disks," Computer Science and Engineering Department, University of California, San Diego, Architectural Support for Programming Languages and Operating Systems, ACM, 13 pages (Mar. 3-7, 2012).
(Continued)

*Primary Examiner* — Jared Rutz
*Assistant Examiner* — Jana Blust
(74) *Attorney, Agent, or Firm* — Patterson & Sheridan, LLP

(57) ABSTRACT

The present disclosure relates to methods and systems for performing operations in a communications protocol. An example method can include submitting, from a device, a request for a queue entry representing a command from a host comprising a request for data stored at a device memory location; receiving the command from the host; and executing the command. An example method can also include selecting a bit string representing whether a requested data stream has been received, and storing the bit string into a memory buffer portion to mark the buffer portion. The method can include receiving, into the memory buffer, the stream. The method can include retrieving contents of the buffer portion, and determining whether the contents contain the bit string. If so, the method can include determining that portions of the stream have not been received. Otherwise, the method can include determining that the stream has been received.

16 Claims, 19 Drawing Sheets

Related U.S. Application Data is a continuation-in-part of application No. 14/466,515, filed on Aug. 22, 2014, now Pat. No. 9,513,869.

(60) Provisional application No. 61/879,554, filed on Sep. 18, 2013.

(52) U.S. Cl.
CPC ............ *G06F 3/0679* (2013.01); *G06F 12/08* (2013.01); *G06F 2206/1014* (2013.01)

(58) Field of Classification Search
CPC .. G06F 12/1081; G06F 13/28; G06F 12/0868; G06F 3/0656; G06F 13/1673; G06F 13/16; G06F 13/4059
USPC ........................................................ 711/103
See application file for complete search history.

(56) References Cited

U.S. PATENT DOCUMENTS

| | | | |
|---|---|---|---|
| 5,983,292 A * | 11/1999 | Nordstrom | G06F 13/126 710/52 |
| 6,128,669 A | 10/2000 | Moriarty et al. | |
| 6,862,646 B2 | 3/2005 | Bonola et al. | |
| 7,234,004 B2 | 6/2007 | Raisch | |
| 7,809,068 B2 | 10/2010 | Seto et al. | |
| 8,032,353 B1 | 10/2011 | Baron et al. | |
| 8,244,962 B2 | 8/2012 | Swing et al. | |
| 8,250,271 B2 | 8/2012 | Swing et al. | |
| 8,380,909 B2 | 2/2013 | Borchers et al. | |
| 9,026,695 B2 | 5/2015 | Wu | |
| 9,176,794 B2 | 11/2015 | Cheng et al. | |
| 9,176,795 B2 | 11/2015 | McCrary et al. | |
| 2005/0198410 A1 | 9/2005 | Kagan et al. | |
| 2006/0045109 A1 | 3/2006 | Blackmore et al. | |
| 2008/0002578 A1* | 1/2008 | Coffman | H04L 47/10 370/230 |
| 2008/0059686 A1 | 3/2008 | Wilkinson | |
| 2010/0161936 A1 | 6/2010 | Royer et al. | |
| 2011/0072172 A1 | 3/2011 | Rodrigues et al. | |
| 2012/0229481 A1 | 9/2012 | McCrary et al. | |
| 2013/0007332 A1 | 1/2013 | Teh et al. | |
| 2013/0086315 A1 | 4/2013 | Kim | |
| 2013/0185532 A1* | 7/2013 | Flynn | G06F 3/061 711/162 |
| 2014/0059270 A1 | 2/2014 | Zaltsman et al. | |
| 2014/0064284 A1 | 3/2014 | Shiraki | |
| 2014/0089444 A1 | 3/2014 | Makhervaks et al. | |
| 2014/0101392 A1 | 4/2014 | Stern | |
| 2014/0149607 A1 | 5/2014 | Shim et al. | |
| 2014/0149625 A1 | 5/2014 | Sharifie et al. | |
| 2014/0164654 A1 | 6/2014 | Wu | |
| 2014/0173149 A1 | 6/2014 | Walker et al. | |
| 2014/0195634 A1 | 7/2014 | Kishore et al. | |
| 2014/0223071 A1 | 8/2014 | Bert et al. | |
| 2014/0317206 A1* | 10/2014 | Lomelino | H04L 67/1097 709/206 |
| 2014/0372637 A1 | 12/2014 | Voorhees et al. | |
| 2015/0127882 A1 | 5/2015 | Carlson et al. | |
| 2016/0062669 A1* | 3/2016 | Chu | G06F 3/0611 711/103 |

OTHER PUBLICATIONS

Goux, L. et al., "Degradation of the Reset Switching During Endurance Testing of a Phase-Change Line Cell," IEEE Transactions on Electron Devices, vol. 56, No. 2, 5 pages (Feb. 2009).

Huai, Y. et al., "Observation of spin-transfer switching in deep submicron-sized and low-resistance magnetic tunnel junctions," Applied Physics Letters, vol. 84, No. 16, 4 pages (Apr. 19, 2004).

Li, C. et al., "Quantifying the Cost of Context Switch," ACM Workshop on Experimental Computer Science, ACM, 4 pages (Jun. 13-14, 2007).

Linux, "All About NVME," Linux Internals, retreived online from URL: <http://kridhnamohanlinux.blogspot.in/2014/05/all-about-nvme.html>, pp. 1-5 (May 8, 2014).

Loke, D. et al., "Breaking the Speed Limits of Phase-Change Memory," Science, vol. 336, 4 pages (Jun. 22, 2012).

No Author Listed, "Leveraging PCIe SSD performance with a full hardware NVMe," NVM Express, ip-maker, retreived online from URL: <http://www.chipestimate.com/tech-talks/2013/02/21/366-Leveraging-PCIe-SSD-performance-with-a-full-hardware-NVMe/366?d=2013-05-21>, 4 pages (May 21, 2013).

No author listed, "NVM Express," Revision 1.1, 163 pages (Oct. 11, 2012).

Ovshinsky, Stanford R., "Reversible Electrical Switching Phenomena in Disordered Structures," Physical Review Letters, vol. 21, No. 20, 6 pages (Nov. 11, 1968).

Samsung, "Industry's First NVMe Solid State Drive," Samsung Ultra-Fast Enterprise Class, 1.6TB SSD (XS1715, Product Overview, retreived online from URL: <http://www.samsung.com/global/business/semiconductor/file/product/XS1715_ProdOverview_2014_1.pdf>, 2 pages (2014).

Seltzer, M. et al., "Disk Scheduling Revisited," Computer Science Division, Department of Electrical Engineering and Computer Science, Proceedings of the 1990 Winter USENIX, USENIX Association, 11 pages (Jan. 1990).

Servalli, G., "A 45nm Generation Phase Change Memory Technology," Electron Devices Meeting, IEEE, 4 pages (No month listed 2009).

Stanovich, M.J. et al., "Throttling On-Disk Schedulers to Meet Soft-Real-Time Requirements," Real-Time and Embedded Technology and Applications Symposium, IEEE, 11 pages (No month listed 2008).

Yang, J. et al., "When Poll is Better than Interrupt," Proceedings of the 10th USENIX conference on File and Storage Technologies, USENIX Association, 7 pages (No month listed 2012).

* cited by examiner

DOORLESS PROTOCOL HAVING MULTIPLE QUEUE READ REQUESTS IN FLIGHT

CROSS REFERENCE TO RELATED APPLICATIONS

This application is a continuation-in-part of and claims the benefit under 35 U.S.C. §120 of U.S. Ser. No. 14/489,994, entitled "DOORBELL-LESS PROTOCOL FOR SOLID STATE DRIVE INTERFACE," filed on Sep. 18, 2014, the contents of which are incorporated herein by reference in their entirety, which is a continuation-in-part of and claims the benefit under 35 U.S.C. §120 of U.S. Ser. No. 14/466,515, entitled "DOORBELL-LESS ENDPOINT-INITIATED PROTOCOL FOR STORAGE DEVICES," filed on Aug. 22, 2014, the contents of which are incorporated herein by reference in their entirety, which claims the benefit under 35 U.S.C. §119(e) of U.S. Provisional Patent Application No. 61/879,554, entitled "Door-less and ACK-less Interface Protocol for Fast Read Storage Media" and filed Sep. 18, 2013, the entire contents of which are incorporated by reference herein.

BACKGROUND

Field of the Disclosure

The present disclosure relates to systems and methods for implementing a communications protocol for a storage media interface.

Related Disclosure

A communications protocol for a storage media interface specifies how a controller on a storage medium receives commands for processing from a host over an interface. To enable faster adoption and interoperability of storage media connected to a host over a peripheral component interconnect express (PCIe) bus, industry participants have defined a communications protocol known as the non-volatile memory express (NVMe) standard. NVMe includes a register programming interface, command set, and feature set definition. These NVMe features enable companies and storage manufacturers to write standard drivers for each operating system, and enable interoperability between implementations that shortens testing and qualification cycles.

NAND flash is a popular non-volatile memory used in a storage medium. Other types of non-volatile memories include phase-change memory (PCM), magnetoresistive RAM (MRAM) and resistive RAM (RRAM or ReRAM). PCM, one of the most promising emerging memory cell contenders, achieves non-volatility by re-melting a material with two distinguishable solid phases to store two or more different bit values. Discovered in 1968, this effect is today widely used in DVD-RW media, and is now making inroads into lithographed memory devices thanks to its favorable device size and scaling properties, high endurance and very fast readout. In MRAMs, data is stored in magnetic storage elements. The storage elements are formed from two ferromagnetic plates, each of which can hold a magnetic field, separated by a thin insulating layer. One of the two plates is a permanent magnet set to a particular polarity, while the other plate's field can be changed to match that of an external field to store memory. ReRAMs operate by changing the resistance of a specially formulated solid dielectric material. A ReRAM device contains a component called memory resistor (memristor), whose resistance varies when different voltages are imposed across it.

SUMMARY

The present disclosure relates to methods, systems, and computer program products for performing operations according to a communications protocol.

One embodiment can include a method of performing operations in a communications protocol. The method can include the steps of submitting, from a target in communication with a host via the communications protocol, a first command request for a first entry in a queue, wherein the first entry in the queue represents a first command inserted into the queue by the host and submitting, from the target, a second command request for a second entry in a queue, wherein the second entry in the queue represents a second command inserted into the queue by the host, before receiving the first entry in the queue. The method can also include receiving, by the target responsive to the first command request, the first entry in the queue, wherein the first received entry in the queue comprises the first command inserted into the queue by the host, and wherein the first command comprises a request for first data and executing, by the target, the first command to provide the requested first data, responsive to the received first entry in the queue. The method can also include receiving, by the target responsive to the second command request, the second entry in the queue, wherein the second received entry in the queue comprises the second command inserted into the queue by the host, and wherein the second command comprises a second request for data and executing, by the target, the second command to provide the requested second data, responsive to the received second entry in the queue.

Another embodiment can include a system for performing operations in a communications protocol. The system can include a host in communication with a memory and a target in communication with the host via the communication protocol, for transmitting a requested data. The target can be configured to submit a first command request for a first entry in a queue, wherein the first entry in the queue represents a first command inserted into the queue by the host and submit a second command request for a second entry in a queue, wherein the second entry in the queue represents a second command inserted into the queue by the host, before receiving the first entry in the queue. The target can also be configured to receive the first entry in the queue, wherein the first received entry in the queue comprises the first command inserted into the queue by the host, and wherein the first command comprises a request for first data and execute the first command to provide the requested first data, responsive to the received first entry in the queue. The target can also be configured to receive the second entry in the queue, wherein the second received entry in the queue comprises the second command inserted into the queue by the host, and wherein the second command comprises a second request for data and execute the second command to provide the requested second data, responsive to the received second entry in the queue.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are

DETAILED DESCRIPTION

Figure 1:
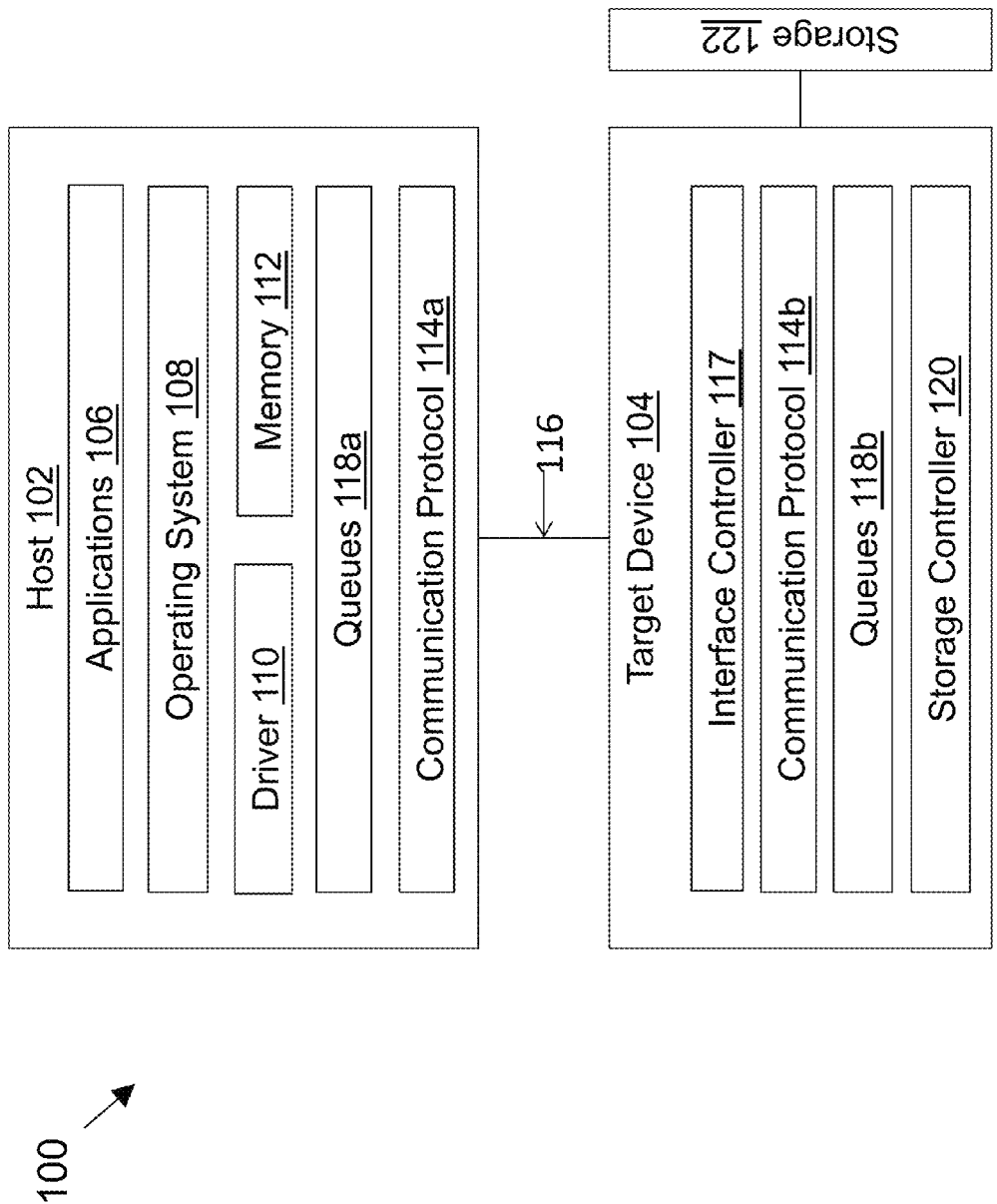
FIG. 1 illustrates an example system implementing a communication protocol, in accordance with some embodiments of the present disclosure.

Emerging non-volatile storage media, can present architectural challenges. Typically, writing to non-volatile storage media can be slow enough to make them impractical for use in a main memory controller of a CPU. However, reading from non-volatile storage media can be so fast that using them in a peripheral storage device could leave much of its performance potential untapped at low command queue depths, throttled by high latencies of common peripheral buses and traditional communication and device protocols.

The present disclosure relates to systems and methods for implementing a communication protocol. In some embodiments of the communication protocol, a target (i.e., device) can poll command queues in host memory substantially periodically or continuously, without having to wait for traditional host-driven initiation such as a "doorbell" command availability signal, whereby the host signals to the device the availability of a new command to process. Furthermore, in some embodiments, the command protocol can eliminate completion signals (i.e., acknowledgement signals) in favor of a completion detection procedure that marks receive buffers in host memory with bit strings, and monitors for disappearance of the bit strings. The bit strings are sometimes referred to herein as "'incomplete' tags" or "'dirty' tags." The communication protocol can reduce latency in communicating with a storage device over an interface. For example, the communication protocol can explore the limits of communication latency with a non-volatile storage device over a PCI Express (PCIe) interface. By eliminating superfluous PCI Express packets and context switches using the communication protocol, performance in a prototype was able to exceed 700,000 input/output operations per second (IOPS) on small random reads at queue depth 1.

The development of NAND flash and the market adoption of flash-based storage peripherals has exposed limitations of a prior generation of device interfaces (e.g., SATA, SAS), prompting creation of an NVM Express (NVMe) protocol. NVMe is a simplified protocol for Non-Volatile Memory (NVM) storage attached to a PCI Express interface. In the course of researching the capabilities of several memory technologies vying to improve upon flash memory, Applicants set out to build NVMe-compliant prototypes as technology demonstrators. Applicants have discovered problems, however, that theoretical maximal performance permitted by traditional communication protocols such as NVMe can throttle the potential of many emerging memory cell technologies such as PCM, MRAM, or ReRAM.

For example, a dramatic advantage of PCM over NAND flash is that readout latency of PCM can be shorter by more than two orders of magnitude. While PCM write latency can be about fifty times longer than reads at current lithographic limits, PCM is already comparable with NAND flash and can be expected to improve further with advances in lithography. This readout latency makes PCM an attractive alternative in settings where workload is dominated by reads.

The communication protocol further allows for building a block storage device that takes advantage of the fast readout of non-volatile memories, to achieve high numbers of input-output operations per second (IOPS) permitted by the low physical latency of the storage medium. While spectacular numbers of IOPS have been touted for flash-based storage media, such performance is generally only possible at impractically high queue depths. Many practical data center usage patterns continue to revolve around low queue depths, especially under completion latency bounds. For example, an illuminating metric of device performance in many settings is round-trip latency to the storage device, as opposed to total bandwidth achievable. Total bandwidth scales easily with device bus width and speed, unlike round-trip latency. Under this more stringent criterion of round-trip latency, traditional flash-based SSDs can top out around 13 kIOPS for small random reads at queue depth 1, limited by over 70 µs of readout latency attributable to the storage medium.

Starting from traditional communication protocols such as NVMe, the communication protocol described herein proceeds to slim down read-side signals and messages by removing unnecessary packet exchanges over interfaces such as PCI Express, and by avoiding mode and context switching. In this manner, testing of the communication protocol showed a possible reduction in average round-trip protocol latency to just over 1 µs, a tenfold improvement over a current implementation of a traditional NVMe-compliant interface protocol. The resulting communication protocol can exceed 700 kIOPS at queue depth 1 on a prototype using a simple benchmark with 512 B reads from PCM across a 4-lane 5 GT/s PCI Express interface, with modest impact on the total power consumption of the system. In the tests discussed above, a PCM was used to examine the performance enhancement of the disclosed communication protocol. A person of ordinary skill would understand that other types of storage media, for example, MRAM or ReRAM, can be used with the disclosed communication protocol and can result in similar performance enhancements.

Current analysis indicates it may not be possible to go much faster without retooling the physical link itself to the storage device.

FIG. 1 illustrates an example system 100 implementing a communication protocol, in accordance with some embodiments of the present disclosure. System 100 includes host 102 in communication with target device 104 and storage 122. Host 102 includes user applications 106, operating system 108, driver 110, host memory 112, queues 118a, and communication protocol 114a. Target device 104 includes interface controller 117, communication protocol 114b, queues 118b, and storage controller 120 in communication with storage 122.

Host 102 can run user-level applications 106 on operating system 108. Operating system 108 can run driver 110 that interfaces with host memory 112. In some embodiments, memory 112 can be dynamic random access memory (DRAM). Host memory 112 can use queues 118a to store commands from host 102 for target 104 to process. Examples of stored or enqueued commands can include read operations from host 102. Communication protocol 114a can allow host 102 to communicate with target device 104 using interface controller 117.

Target device 104 can communicate with host 102 using interface controller 117 and communication protocol 114b. Communication protocol 114b can provide queues 118 to access storage 122 via storage controller 120.

Figure 2A:
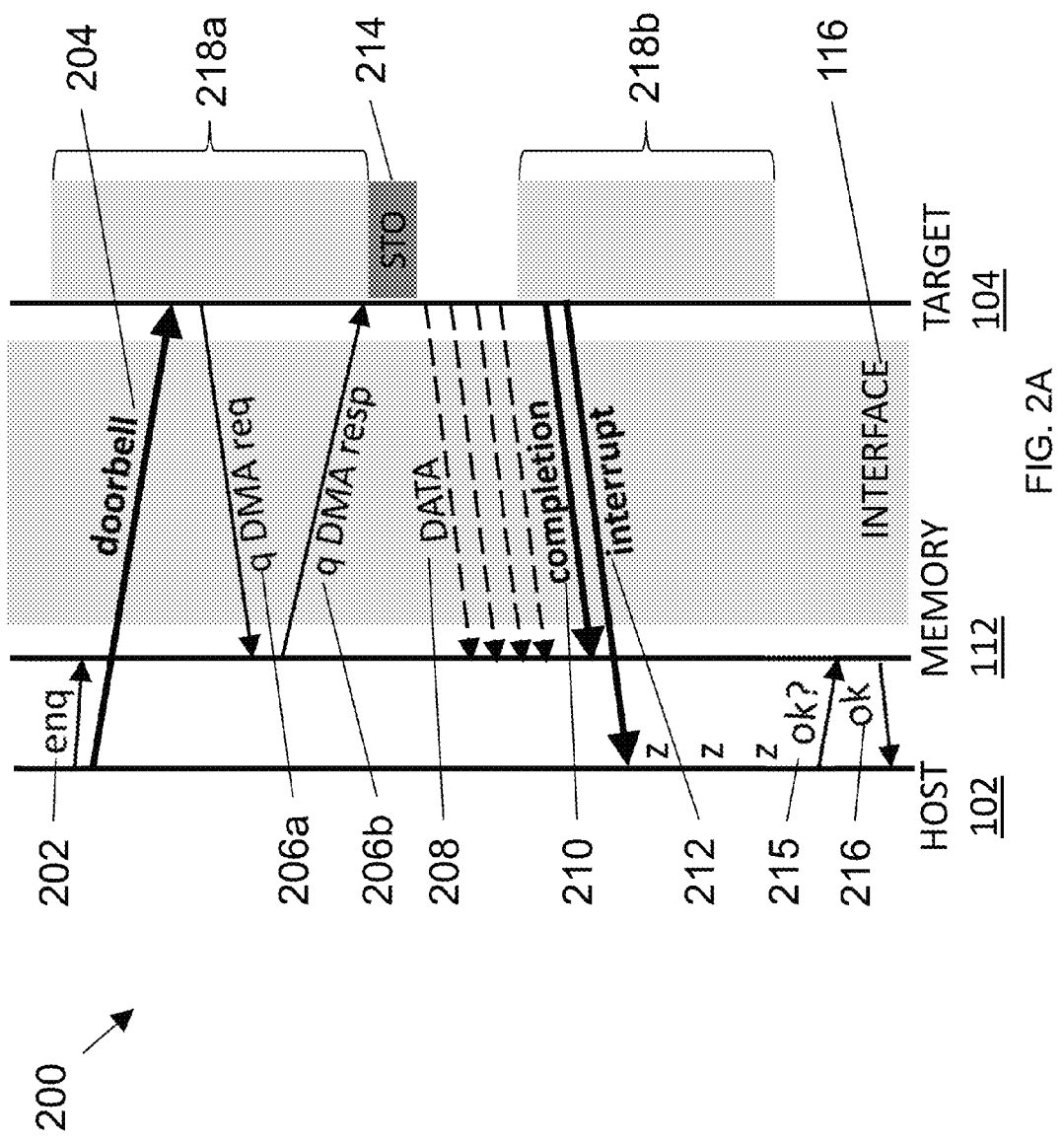
FIG. 2A illustrates an example message flow of a Non-Volatile Memory Express (NVMe)-compliant read operation, in accordance with some embodiments of the present disclosure.

Doorbell-less Communication Protocol Including Target-initiated Queue Processing FIG. 2A illustrates an example message flow 200 of an NVM Express (NVMe) communication protocol, in accordance with some embodiments of the present disclosure. FIG. 2A illustrates host 102 in communication with host memory 112 and target 104 over interface 116.

The message flow and timing diagrams herein, including FIG. 2A, are for illustrative purposes. Time is generally shown flowing down, and the illustrated timing is not to scale. The communication protocol for reading a block from target 104 can begin with host 102 preparing and enqueuing a read command in host memory 112 (step 202) and initiating the transaction by sending a "doorbell" packet (step 204) over interface 116 (e.g., PCI Express). The doorbell, also referred to herein as a command availability signal, signals the target device that there is a new command waiting, such as a read command. In response, the target device can initiate a direct memory access (DMA) request—resulting in transmission of another PCI Express packet—to retrieve the enqueued command from the queue in memory 112 (step 206a). The PCI Express packets, discussed in more detail below, can generally result in small penalties on the maximal payload bandwidth remaining A data packet can settle into the host memory 112 in atomic fashion, regardless of the type of bus or communication network used. Accordingly, the system does not need to check whether the data has settled in the host memory 112 at any finer granularity than one packet length.

Specifically, host 102 can enqueue ("enq") a command (step 202) such as a read command, and can ring a command availability signal ("doorbell") (step 204). In some embodiments, host 102 can include a CPU that interacts with host memory 112. The doorbell signal can represent a command availability signal that host 102 uses to indicate to the device that a command is available in a queue in memory 112 for the device to retrieve. In response to receiving the doorbell signal, the device can send a command request to retrieve the queue entry (step 206a). For example, the command request can be a direct memory access (DMA) request for the queue entry. The device can receive the requested entry from the queue (step 206b). For example, the device can receive the DMA response from memory 112 on host 102. The device can parse the command in the queue (e.g., the read command), and execute the command. For example, the device can send the requested data packets to memory 112 (step 208). After the device has completed sending the requested data, the device can write an entry, or acknowledgement signal, into a completion queue (step 210). The device can further assert an interrupt that notifies the host that the device has finished writing the requested data (step 212). A thread on the CPU on host 102 can handle the interrupt. From the time the interrupt signal reaches the CPU on host 102, it takes a lot of cycles to do the context switch and carry on with the thread that was waiting for the data from target 104. Hence, the thread can be considered as if it is "sleeping" for a few microseconds after the interrupt arrives. Subsequently, when the CPU on the host 102 wakes up, it can query the host memory 112 to confirm that the completion signal is in fact in the completion queue (step 215). Memory 112 can respond back to the host CPU with a confirmation when the completion signal is in the completion queue (step 216).

Bars 218a-218b illustrate protocol latencies incurred due to the traditional NVMe communication protocol. These latencies can be improved by replacing the traditional NVMe communication protocol with the systems and methods described herein. Rectangle 214 illustrates an amount of time when the device actually reads storage 112, for example, NAND flash, PCM, MRAM, or ReRAM. The amount of time when the device actually reads storage 112 (rectangle 214) is relatively small compared to the time that corresponds to protocol latencies (bars 218a-218b), which indicates that the latency and overhead incurred by a traditional communication protocol such as NVMe can be overwhelming in comparison.

Figure 2B:
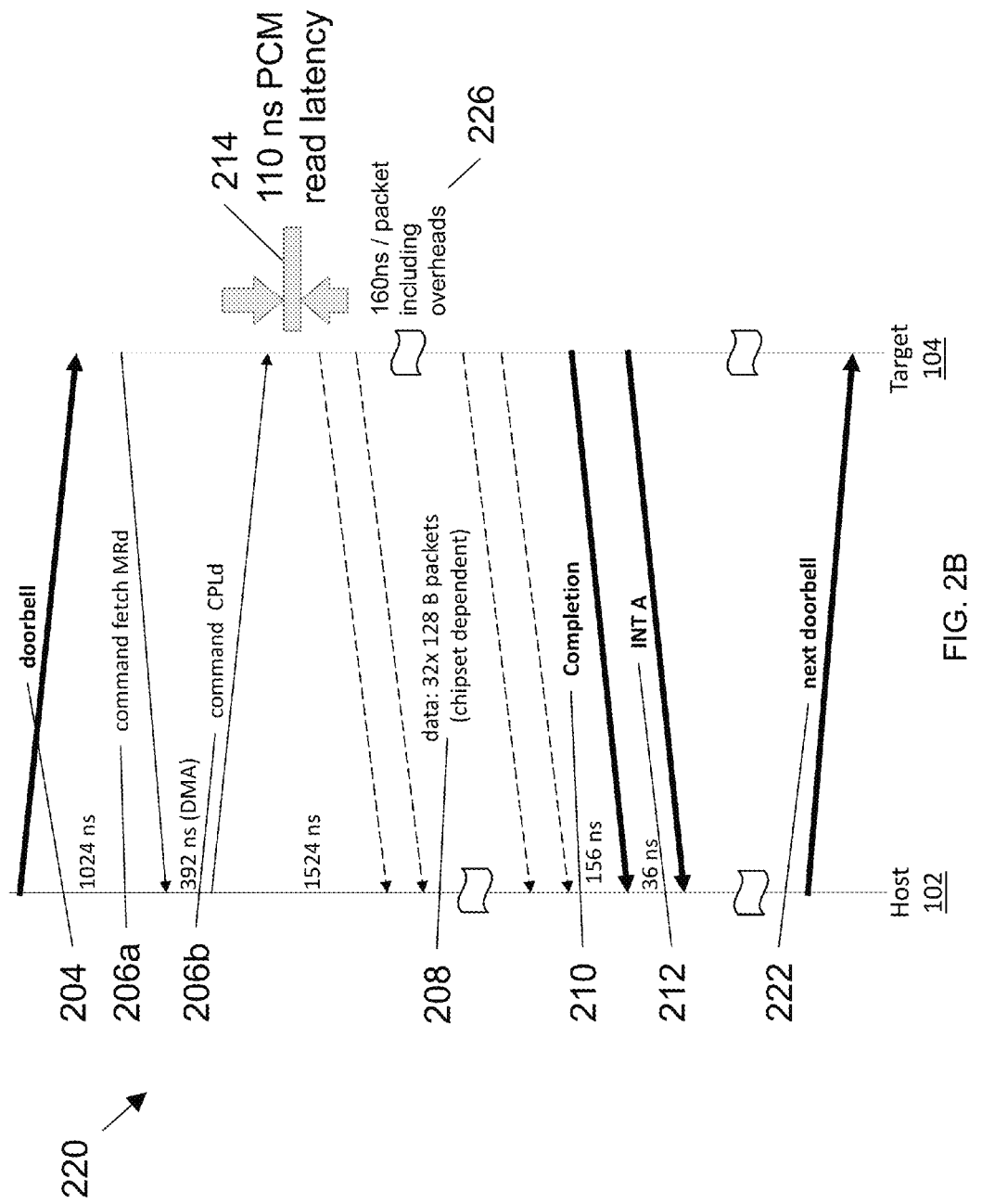
FIG. 2B illustrates an example timing diagram of an NVM Express (NVMe)-compliant read operation, in accordance with some embodiments of the present disclosure.

FIG. 2B illustrates an illustrative timing diagram 220 of an NVM Express (NVMe)-compliant read operation, in accordance with some embodiments of the present disclosure. FIG. 2B illustrates host 102 in communication with target 104.

A communication protocol for reading one block from the storage device can begin with the host CPU preparing a read command in host DRAM and initiating the transaction by sending a command availability signal, or "doorbell" signal or message, over an interface such as PCI Express (step 204). For example, the command availability signal can signal to target 104 that there is a new read command waiting. In response, target 104 can initiate a command request, e.g., command fetch MRd ("memory read"), to retrieve the queue entry (step 206a). For example, target 104 can initiate a direct memory access (DMA) request to pick up the command from the queue in the host DRAM. In timing experiments run against a prototype configuration, the time elapsed from sending the command availability signal (step 204) to target 104 initiating the command request was about 1024 ns. Furthermore, retrieving the queue entry can use a packet over the PCI Express interface, which can result in a small penalty on remaining payload bandwidth. Host 102 can retrieve the requested queue entry (using about 392 ns for a corresponding direct memory access (DMA) request), and host 102 can send the requested queue entry, e.g., command CPLd ("completion with data"), using another packet over the PCI Express bus (step 206*b*).

Since every round trip over PCI Express can incur well over 0.6 μs latency on today's fastest hardware, a traditional communications protocol can waste over a microsecond of signaling and messages back-and-forth over the bus before target 104 can even commence the actual reading of data from the non-volatile storage medium. The non-volatile storage medium can perform the actual reading of the data 214 quickly, for example using only about 80 ns (i.e., about an order of magnitude faster than the latency incurred by the round trip signaling over the interface), which is the time sense amplifiers in the memory chip(s) to settle on their bit values. With traditional non-volatile storage media, such as NAND flash memory, having a fundamental read latency between 25 and 80 μs, this extra request latency traditionally represented but a small fraction of total transaction time and so was deemed negligible. In contrast, the fundamental latency to first byte read from a modern non-volatile memory chip, for example, a PCM chip, can be about 110 ns, which includes the 80 ns for the sense amplifiers to settle on their bit values and an additional about 30 ns to start recovering these values via the memory bus. Accordingly, a traditional communication protocol can become severely limiting when trying to improve overall performance of target 104 and a corresponding non-volatile storage device for small random reads at queue depth 1.

Host 102 can receive the requested data from the non-volatile storage medium via target 104 (step 208). An example of data sent can be about 32 packets with each packet being about 128 bytes, for a total of about 4 KB data transferred. Transferring the data packets over the PCI Express interface can incur about 160 ns per packet, including overhead (226). After the device has completed sending the requested data, the device can write an entry, or acknowledgement signal, into a completion queue (step 210) informing the memory 112 that the requested data packets have been transferred. Target 104 can further assert an interrupt that notifies host 102 that target 104 has finished writing the requested data (step 212). A thread on the CPU on host 102 can handle the interrupt. In some embodiments, the interrupt can be a legacy interrupt. In other embodiments, target 104 can also send other types of interrupts such as message signaling interrupts (MSI) or extended message signaling interrupts (MSI-X). When host 102 has another command to process, host 102 can send a next command availability signal, or "doorbell" signal (step 222). This second doorbell is sent from the CPU on the host 102 to the target 104, so that the target 104 knows that the host 102 has handled the completion, i.e., that completion queue entry is free for the next completion.

Figure 3:
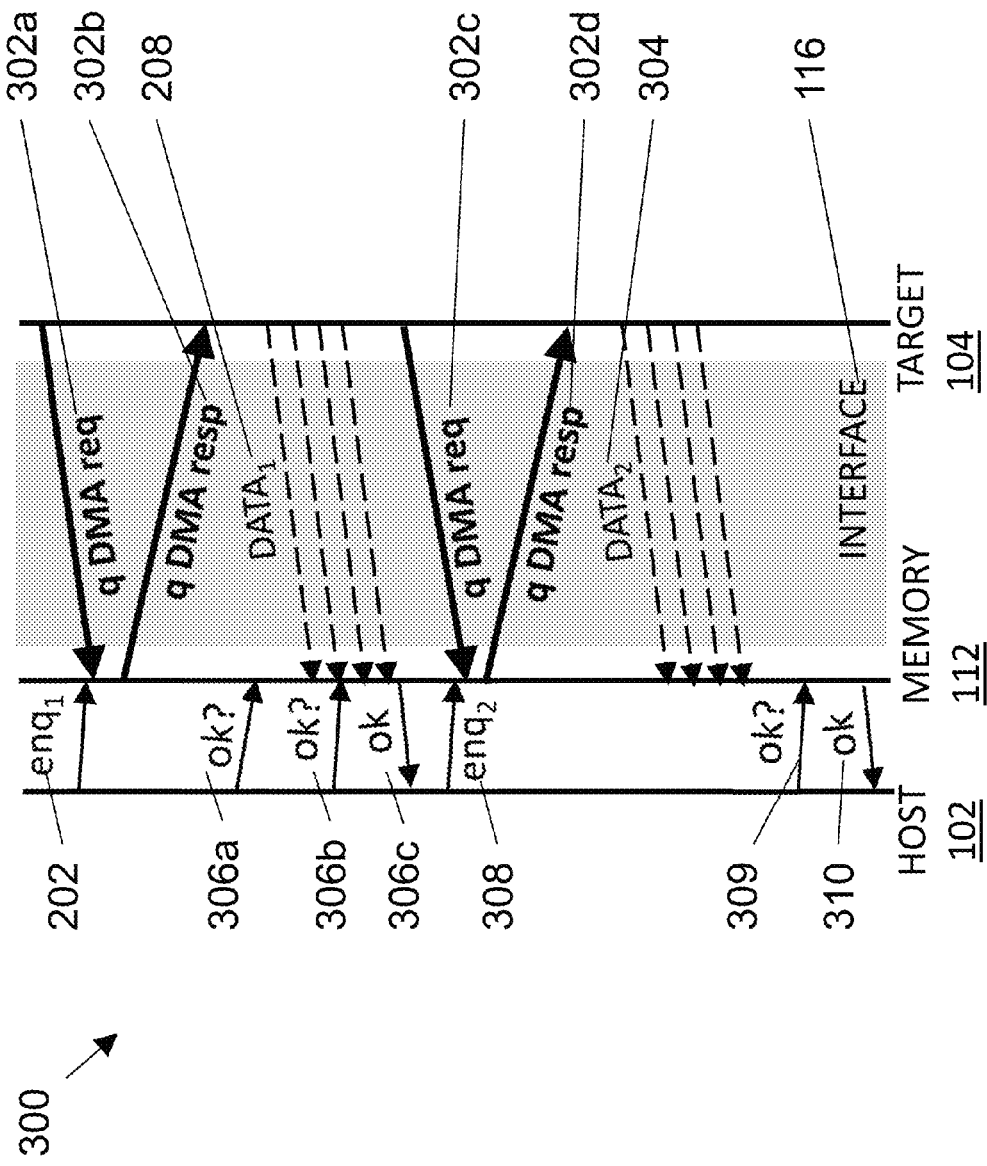
FIG. 3 illustrates an example message flow of the communication protocol, in accordance with some embodiments of the present disclosure.

FIG. 3 illustrates an illustrative message flow 300 of the communication protocol, in accordance with some embodiments of the present disclosure. Message flow 300 includes host 102 in communication with memory 112, and memory 112 in communication with target 104 over interface 116. FIG. 3 illustrates an example of the communication protocol at queue depth 1. In contrast to FIGS. 2A-2B, message flow 300 contains no distinct command availability (e.g., doorbell) signals, nor completion (e.g., acknowledgement) signals or corresponding interrupts. Instead, the storage device sends out target-initiated DMA requests for new commands substantially periodically or continuously.

Applicants have discovered the problem that the latency of one packet exchange using traditional communication protocols over interface 116, such as an NVMe communication protocol over PCI Express, can exceed the time used to transfer a kilobyte of data. Systems and methods using the communication protocol described herein can improve performance of read operations by eliminating packet exchanges determined to be unnecessary. Examples of packet exchanges for potential elimination can include removing distinct command availability (e.g., doorbell) signals, completion (e.g., acknowledgement) signals, and corresponding interrupts. Instead, some embodiments of the communication protocol can use target-driven queue polling as an alternative to command availability signals traditionally used for initiating a transaction.

With this problem in mind, according to the communication protocol the device can send requests for one or more commands in the read queue in host DRAM substantially periodically or continuously, without waiting for command availability signals, so that there is substantially always a request "in flight." For example, after host 102 enqueues a command such as a read operation (step 202), the device can send a target-initiated command request, to request one or more commands in the read queue in memory 112 (e.g., host DRAM) (step 302*a*). Upon receiving the requested queue entry from host memory 112 (step 302*b*), target 104 can send the requested data to host memory 112 (step 208). Host 102 can query the host memory 112 to determine whether the response from target 104 satisfies the command requested by host 102 (step 306*a*-*b*). Memory 112 can respond to the host 102 queries when the requested data from target 104 have been copied to memory 112 (step 306*c*).

Host 102 can enqueue a subsequent command (step 308). Without waiting for a distinct command availability signal or doorbell signal to initiate the transaction, target 104 can proceed to initiate a subsequent command request to request one or more subsequent commands in the read queue in memory 112 (step 302*c*). Upon receiving the requested queue entry (step 302*d*), target 104 can send the requested data to memory 112 (step 304). In response to receiving the requested data, memory 112 can inform host 102 that memory 112 has received the requested data successfully ("ok") in response to the read operation requested by host 102 (step 310).

Figure 4A:
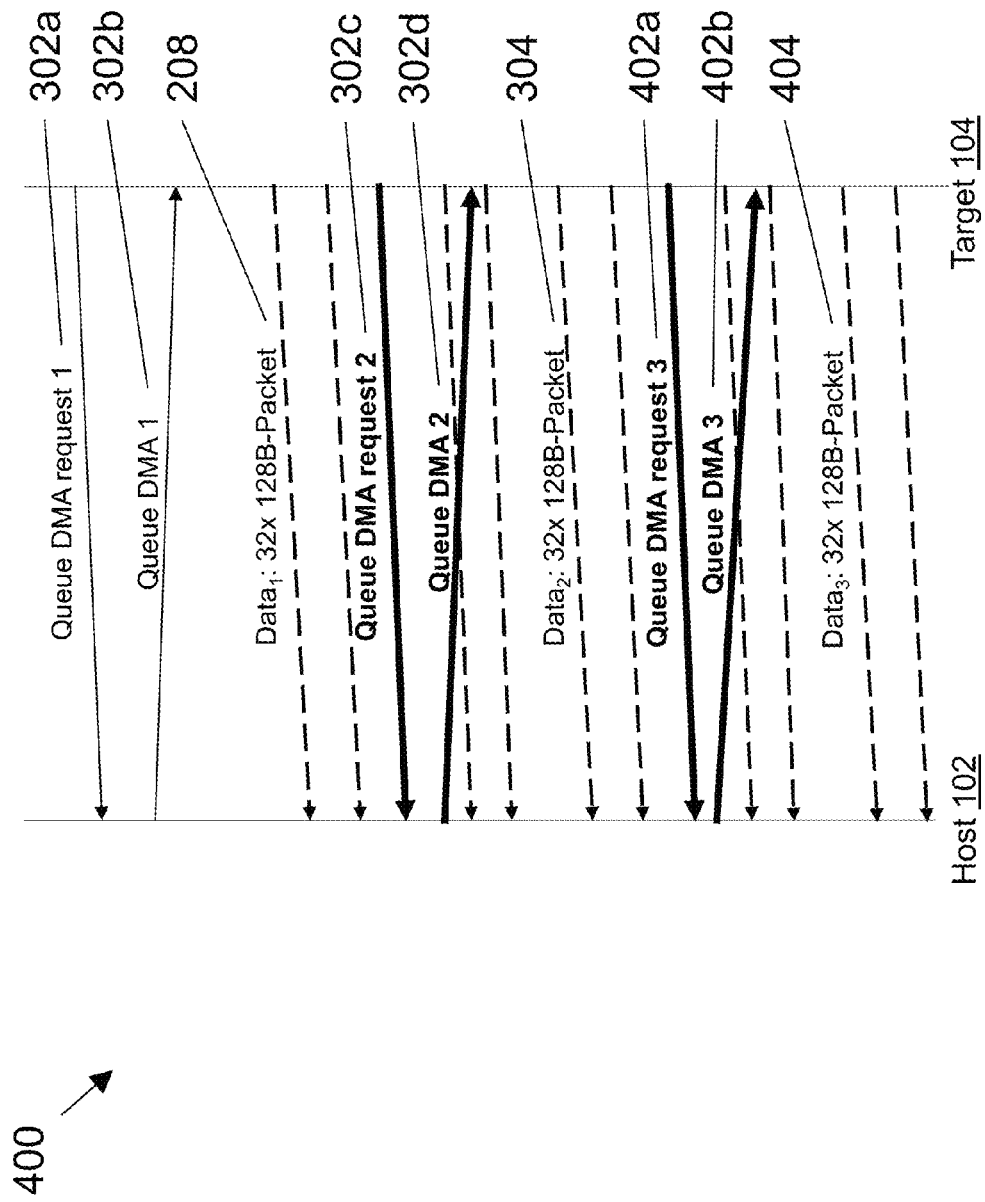
FIGS. 4A-C illustrate exemplary message flows of the communication protocol, in accordance with some embodiments of the present disclosure.

FIG. 4A illustrates an illustrative message flow 400 of the communication protocol, in accordance with some embodiments of the present disclosure. Message flow 400 includes host 102 in communication with target 104. Message flow 400 illustrates an example of the communication protocol operating at higher queue depths (e.g., queue depths greater than 1).

Some embodiments of the communication protocol can include initiating, from target 104, subsequent command requests (e.g., DMA requests such as Queue DMA request 2 (step 302*c*) and Queue DMA request 3 (step 402*a*)) for new commands, prior to target 104 completing data transmission for the previous command so as to interleave the subsequent command request with completing the data transmission. This embodiment can leverage the full-duplex nature of interfaces such as PCI Express to allow for seamless data transmission and transactions. Full-duplex interfaces such as PCI Express can allow substantially simultaneous transmission and reception over the interface, in contrast to half-duplex interfaces that can allow either transmission or reception but not both. Accordingly, full-duplex interfaces can allow target 104 to use the communication protocol to receive a subsequent command response to host 102 (e.g., steps 302*d*, 402*b*), at substantially the same time as target 104 can send previously requested data packets to host 102 in response to a previous command.

Specifically, target 104 can initiate a command request for an entry in a memory queue (step 302*a*) and receive from host 102 the requested queue entry (step 302*b*). Target 104 can begin providing packets of the requested data (step 208). Prior to target 104 completing the requested data transmission for the previous command, some embodiments of the communication protocol can determine a time for initiating a subsequent command request. At the determined time, target 104 can initiate a subsequent command request for a subsequent entry in the memory queue, e.g., Queue DMA request 2 (step 302*c*) and receive from host 102 the requested subsequent queue entry (step 302*d*) so as to interleave the subsequent command request with completing the data transmission. In some embodiments, target 104 can use the communication protocol to leverage a full-duplex interface such as PCI Express to transmit previously requested data at substantially the same time as target 104 receives the requested subsequent queue entry from host 102. In response to the requested subsequent queue entry (step 302*d*), target 104 can begin transmitting the subsequently requested data (step 304).

As target 104 is performing the requested data transmission for the subsequent command (step 304), some embodiments of the communication protocol can determine a time for initiating a further command request. At the determined time, target 104 can initiate a further command request for a further entry in the memory queue, e.g., Queue DMA request 3 (step 402*a*) and receive from host 102 the requested further queue entry (step 402*b*). As before, in some embodiments target 104 can use the communication protocol to leverage a full-duplex interface such as PCI Express to transmit the requested data at substantially the same time as target 104 receives the requested further queue entry from host 102. In response to the requested subsequent queue entry (step 402*b*), target 104 can begin transmitting the subsequently requested data (step 404).

The communication protocol can generally support high load. With high load, a new command can almost always be expected to be waiting in the memory queue, should target 104 initiate a command request for a new command. Accordingly, some embodiments of the command protocol can recognize that sending a command availability signal (e.g., doorbell) for every small read could be superfluous. In the quest for performance under high load conditions, latency can become an important factor. Accordingly, the communication protocol can treat a given fraction of "no news" transfers (i.e., command requests for which the memory queue turns out to be empty) as acceptable overhead.

In some embodiments, determining the time for submitting the subsequent command request, e.g., Queue DMA request 2 (step 302*c*) or Queue DMA request 3 (step 402*a*), can include predicting an arrival time of a subsequent command from the host. For example, since the system can probe actual round-trip latency for a given direct memory access (DMA) request to complete on a specific system configuration, target 104 can initiate anticipatory queue read requests, prior to sending all data packets for a previous request. Accordingly, target 104 can receive the next commands, if available, just in time when target 104 becomes able to service another command. In some embodiments, if target 104 determines that a certain percentage or ratio of command requests is resulting in querying an empty queue, target 104 can adjust the determined time for submitting the subsequent command requests. In some embodiments, if the timing of read commands from host 102 is predictable, even without having actual round-trip latency measures from a specific system configuration, target 104 can adjust the determined time for submitting the subsequent command requests.

Figure 4B:
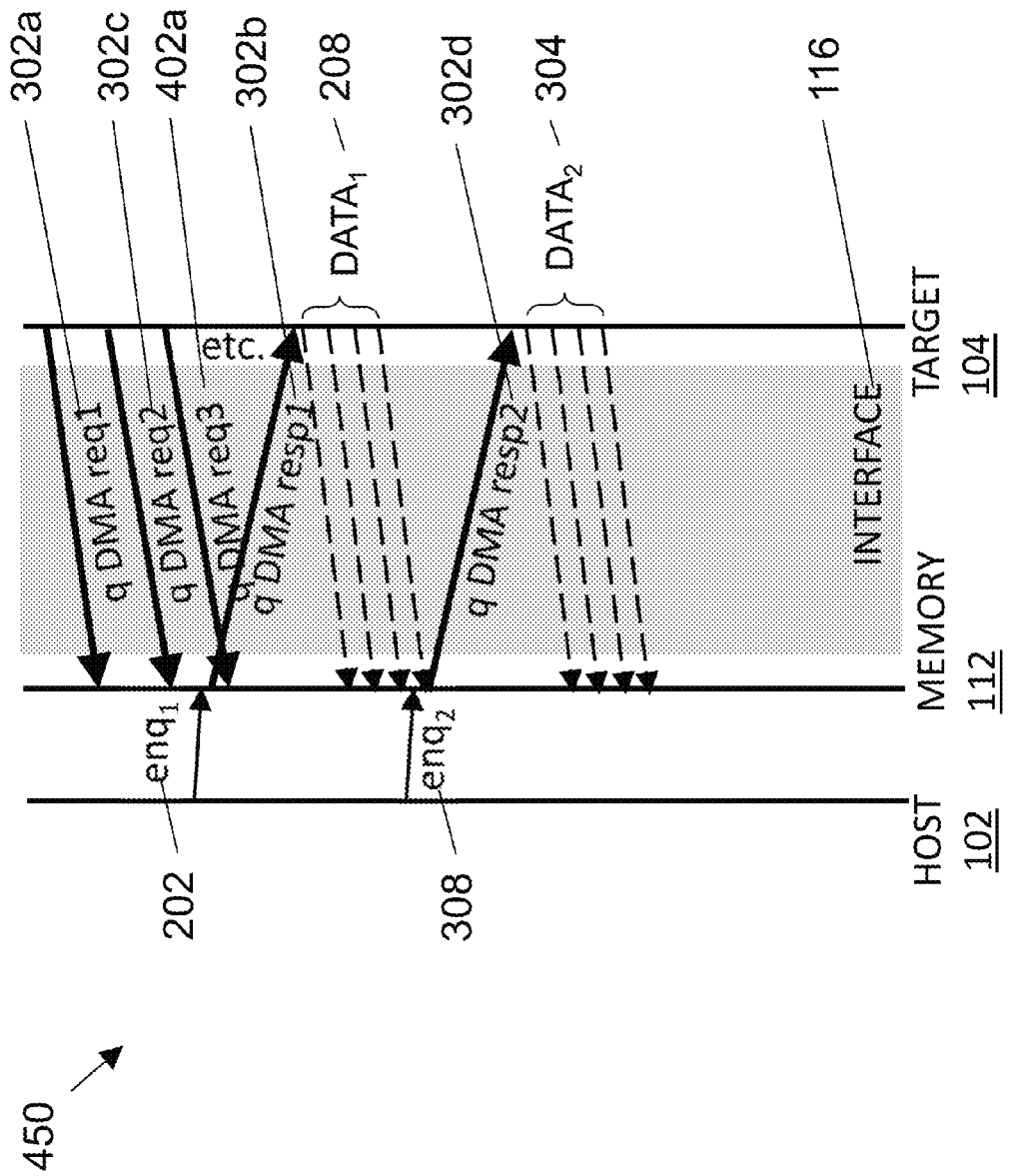

FIG. 4B illustrates an illustrative message flow 450 of the communication protocol, in accordance with some embodiments of the present disclosure. The illustrated message flow 450 can reduce end-to-end latency of a protocol that communicates over a serialized link, such as PCI Express, Ethernet or Infiniband. Message flow 450 includes host 102 in communication with memory 112, and memory 112 in communication with target 104 over interface 116. Similar to FIG. 3, message flow 450 contains no distinct command availability (e.g., doorbell) signals, nor completion (e.g., acknowledgement) signals or corresponding interrupts. Instead, the storage device can continuously send out target-initiated poll requests, e.g., DMA requests, for new commands. Specifically, the target device can send out target-initiated DMA requests for new commands whenever the target is capable of handling new commands.

As discussed above, in some cases the latency of one packet exchange using traditional communication protocols over interface 116, such as an NVMe communication protocol over PCI Express, can exceed the time to transfer, for example, a kilobyte of data. For example, if the communication interface 116 has many hops between the host 102 and the target 104 that add up to a high total latency, e.g., fifty seconds to pass one packet one way, then a target with only one outstanding poll request will receive a new command no more often than once every hundred seconds, which is the time for two one-way trips between the host 102 and the target 104. If the target can handle new requests instantly, the host can receive the requested data in a hundred and fifty seconds on average, i.e., the expected value between a hundred and two hundred seconds depending on when the command was entered into the queue relative to the time the poll reaches the host.

As discussed above, FIG. 4A shows that target 104 can initiate a command request for an entry in a memory queue (step 302*a*) and can receive from host 102 the requested queue entry (step 302*b*), before initiating a subsequent command request (step 302*c*). Systems and methods using the communication protocol described herein can improve performance of read operations by enabling the target device to continuously send poll requests to the host, e.g., without waiting to receive the requested queue entries from the host before sending subsequent poll requests, and have multiple outstanding poll requests "in flight." For example, assuming target 104 sends out one poll request every second, the first poll request will reach the host in fifty seconds, but at that time there will be forty nine more queued up on the link, reaching the host on average once per second, within the variability of link latency. Therefore, if the host drops a new command into the queue, the command can be picked up for transmission to the target no later than one second later, e.g., half a second on average. This results in the average completion latency dropping down to a hundred and point five (100.5) seconds from the original hundred and fifty seconds when there was only one poll request outstanding.

For example, referring to FIG. 4B, target 104 can send a first target-initiated command request, "q DMA req1", to request one or more commands in the read queue in memory 112 (e.g., host DRAM) (step 302*a*). Without waiting for a distinct command availability signal or doorbell signal to initiate the transaction, target 104 can proceed to initiate a subsequent command request, "q DMA req2," to request one or more subsequent commands in the read queue in memory 112 (step 302*c*). Subsequently, target 104 can send a third target-initiated command request, "q DMA req3," to request one or more commands in the read queue in memory 112 (e.g., host DRAM) (step 402*a*), and so on, without waiting to receive a requested entry from the host memory, before sending out a new command request.

When host 102 enqueues a command (step 202), for example, a command corresponding to the first target-initiated command request, "enq$_1$," a response with the requested queue entry, "q DMA resp1" is sent to the target 104 (step 302*b*). Upon receiving the requested queue entry from host memory 112, target 104 can send the requested data, "DATA$_1$," to host memory 112 (step 208).

Then, host 102 can enqueue a subsequent command (step 308), for example, a command corresponding to the second target-initiated command request, "enq$_2$." Upon receiving the requested queue entry, "q DMA resp2" (step 302*d*), target 104 can send the requested data, "DATA$_2$," to memory 112 (step 304).

Figure 4C:
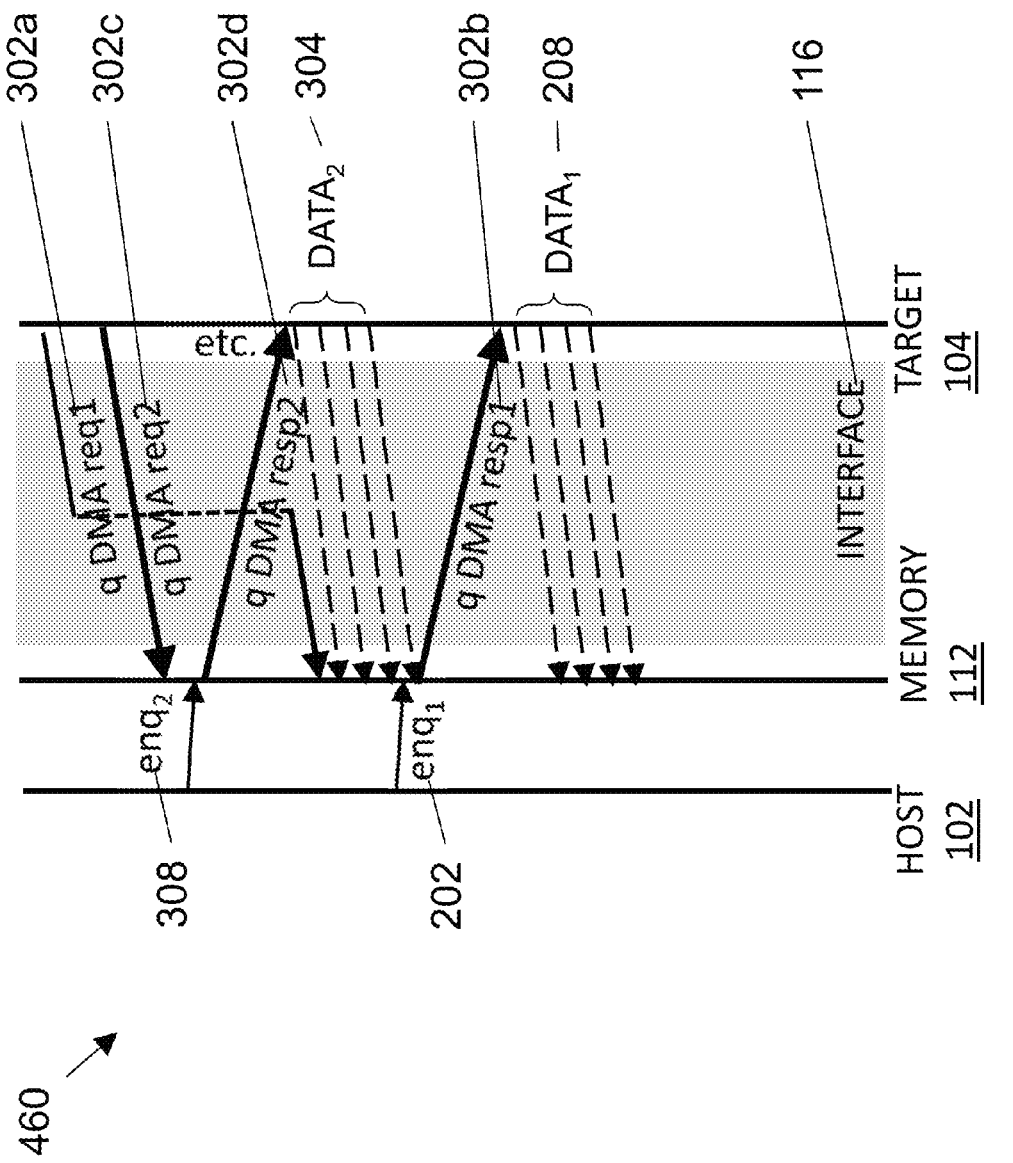

FIG. 4B described read operations by enabling the target device to continuously send poll requests to the host and processing these poll requests by the host in the order they were received. FIG. 4C illustrates another illustrative message flow 460 of the communication protocol, in accordance with some embodiments of the present disclosure. As discussed above, if the communication interface 116 has many hops between the host 102 and the target 104 target-initiated, poll requests can reach the host out-of-order. FIG. 4C illustrates this. For example, target 104 can send a first target-initiated command request, "q DMA req1," to request one or more commands in the read queue in memory 112 (step 302*a*). Without waiting for a distinct command availability signal or doorbell signal to initiate the transaction, target 104 can proceed to initiate a subsequent command request, "q DMA req2," to request one or more subsequent commands in the read queue in memory 112 (step 302*c*). However, the second target-initiated command request can reach the host before the first target-initiated command request, as shown in FIG. 4C. If the host allows processing of out-of-order target-initiated poll requests, the host can enqueue a command, enq$_2$, corresponding to the second target-initiated command request (step 308), before receiving the first target-initiated poll request. Upon receiving the requested queue entry, "q DMA resp2," (step 302*d*), target 104 can send the requested data, DATA$_2$, to memory 112 (step 304).

Host 102 can enqueue a command, enq$_1$, corresponding to the first target-initiated command request (step 202), and subsequently a response with the requested queue entry can be sent to target 104. Upon receiving the requested queue entry from host memory 112, "q DMA resp1," (step 302*b*), target 104 can send the requested data to host memory 112 (step 208).

Aspects of the present disclosure have been discussed in connection with a target initiating polling requests to a host. Persons skilled in the art would understand that the target device can initiate polling requests to a plurality of hosts or that more than one target devices can initiate polling requests to one or more hosts. In addition, those skilled in the art would understand that the disclosed polling methods and systems can involve initiating polling requests by one or more hosts, for example, completion polling requests, directed to one or more target devices.

Figure 5A:
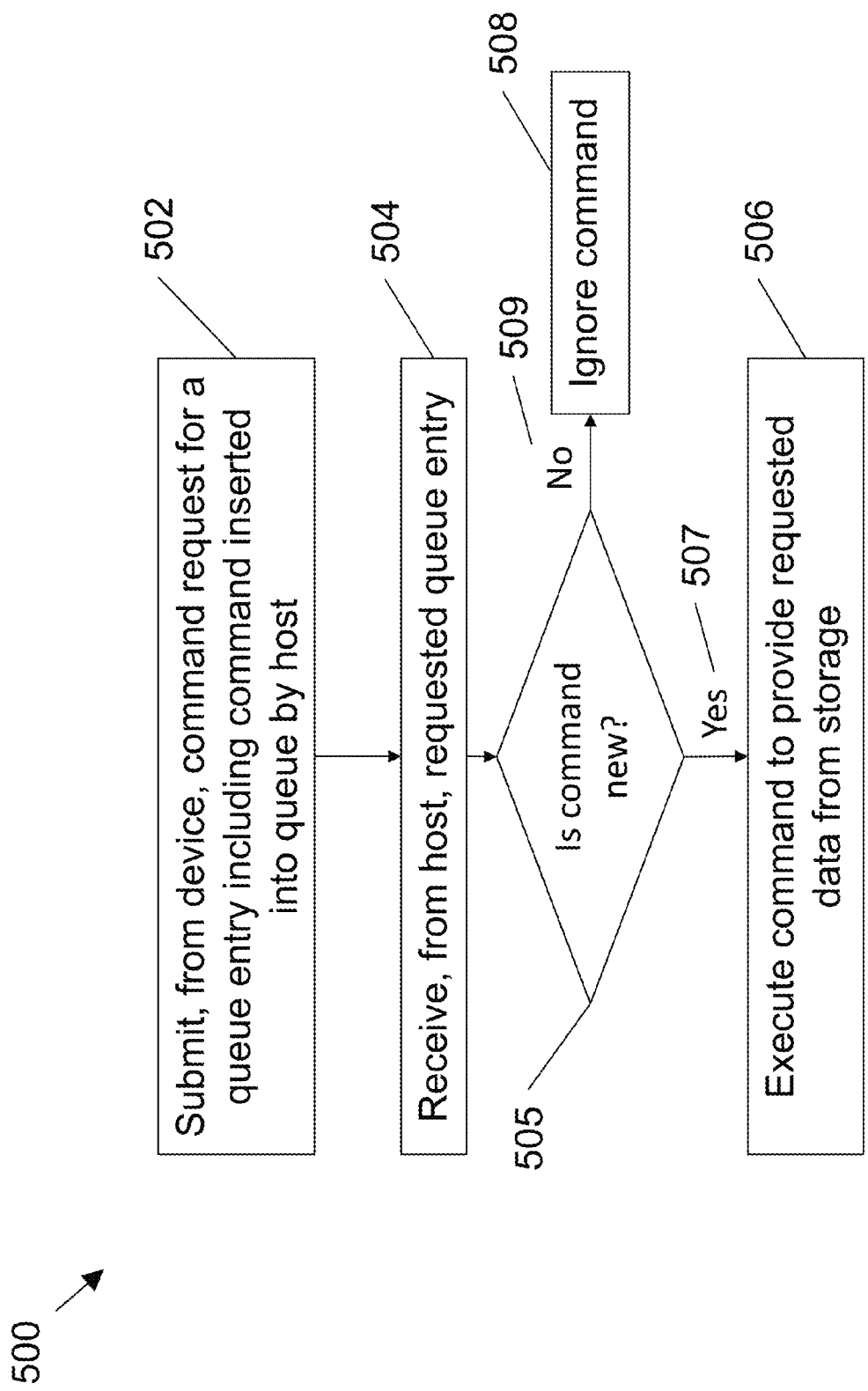
FIGS. 5A-B illustrate exemplary methods for the communication protocol, in accordance with some embodiments of the present disclosure.

FIG. 5A illustrates an example method 500 for the communication protocol, in accordance with some embodiments of the present disclosure. Method 500 can include submitting, from the device, a command request for a queue entry on a host including a command inserted into the queue by the host (step 502); receiving, from the host, the requested queue entry (step 504). The method can then check whether the retrieved command is new (step 505) and execute the requested command if it is new (507) to provide requested data from storage (step 506). If the retrieved command is not new (509) the retrieved command is ignored.

Submitting, from the device, a command request (step 502) can include performing a direct memory access (DMA) request for one or more entries in a memory queue. The queue entry can represent a requested command, such as a read command, that is inserted by the host so as to retrieve requested contents of a memory block on a storage medium. In some embodiments, submitting the command request for the entry can include submitting the command request without receiving, from the host, a command availability signal or doorbell signal prior to submitting the command request.

Receiving, from the host, the requested queue entry (step 504) can include retrieving the requested command from the queue. For example, the target can receive a DMA response from the memory on the host that includes the requested command.

Executing the command to provide the requested data from storage (step 506) can include performing a read request to retrieve the requested data from non-volatile storage medium, and providing the retrieved data to the host. In some embodiments, executing the command can further include providing the requested data as a packet stream, and interleaving a subsequent command request and subsequent command response prior to completion of providing the requested data.

Figure 5B:
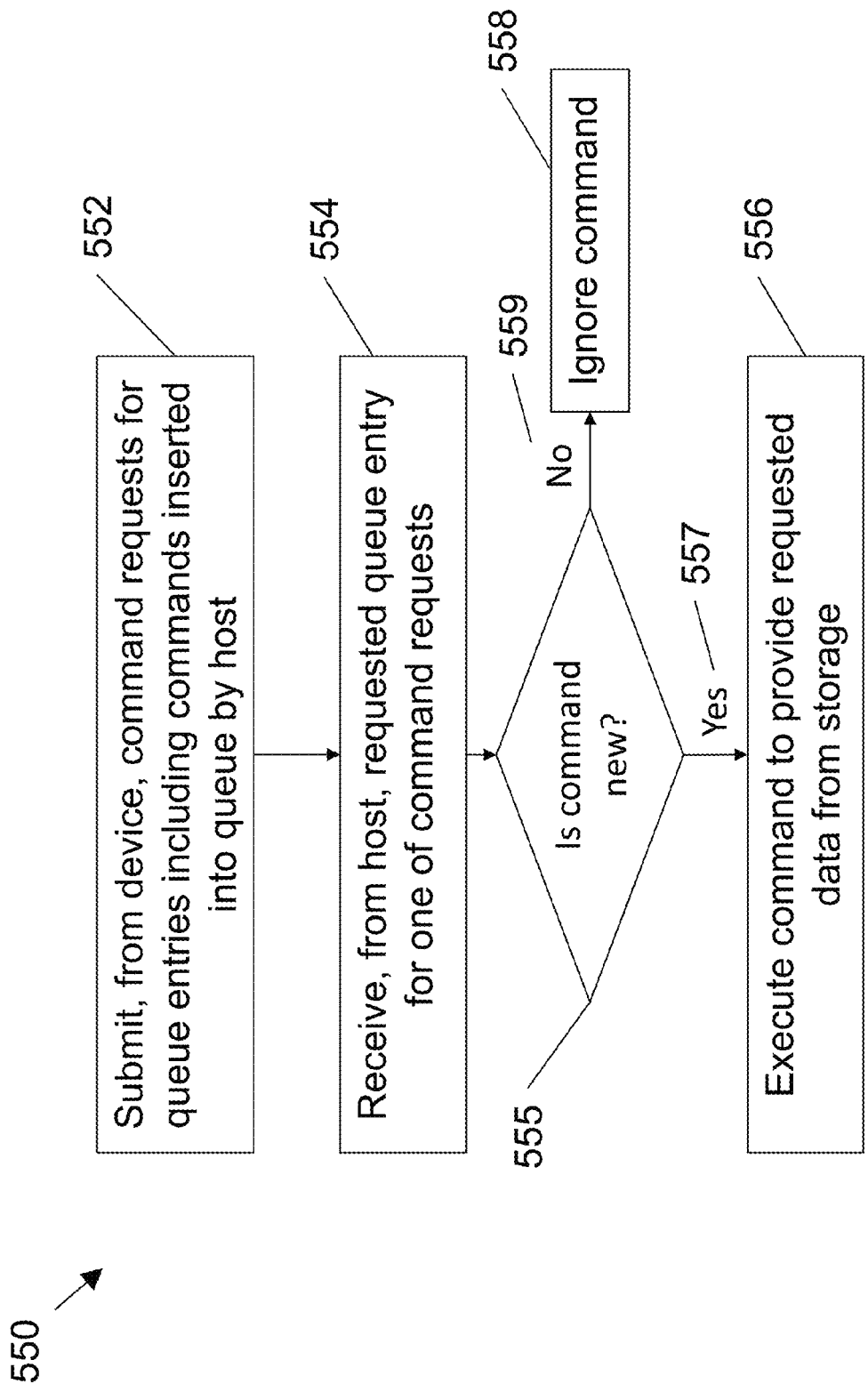

FIG. 5B illustrates an exemplary method 550 for the communication protocol, in accordance with some embodiments of the present disclosure. Method 550 can include submitting, from the device, command requests for queue entries on a host including commands inserted into the queue by the host (step 552). In contrast to the method illustrated in FIG. 5A, more than one command requests can be submitted from the target device before receiving from the host a requested queue entry. The target device can the receive, from the host, a requested queue entry for one the submitted command requests (step 554). The method can then check whether the retrieved command is new (step 555) and execute the requested command if it is new (step 557) to provide requested data from storage (step 556). If the retrieved command is not new (step 559) the retrieved command is ignored.

Submitting, from the device, command requests (step 552) can include performing a direct memory access (DMA) requests for multiple entries in a memory queue. Each queue entry can represent a requested command, such as a read command, that is inserted by the host so as to retrieve requested contents of a memory block on a storage medium. In some embodiments, submitting the command requests can include submitting the command requests without receiving, from the host, command availability signals or doorbell signals prior to submitting the command requests.

Receiving, from the host, the requested queue entries (step 554) can include retrieving the requested commands from the queue. For example, the target can receive a DMA response from the memory on the host that includes one of the requested commands.

Executing the command to provide the requested data from storage (step 556) can include performing a read request to retrieve the requested data from non-volatile storage medium, and providing the retrieved data to the host. In some embodiments, executing the command can further include providing the requested data as a packet stream, and interleaving a subsequent command request and subsequent command response prior to completion of providing the requested data.

Acknowledgement-less Communication Protocol Including Marking Memory Buffers as Incomplete The previous section discussed signaling initiation of a transaction in the communication protocol, where the initiation is signaled by a target device rather than by a host. This section discusses signaling completion of a transaction in the communication protocol.

Figure 6:
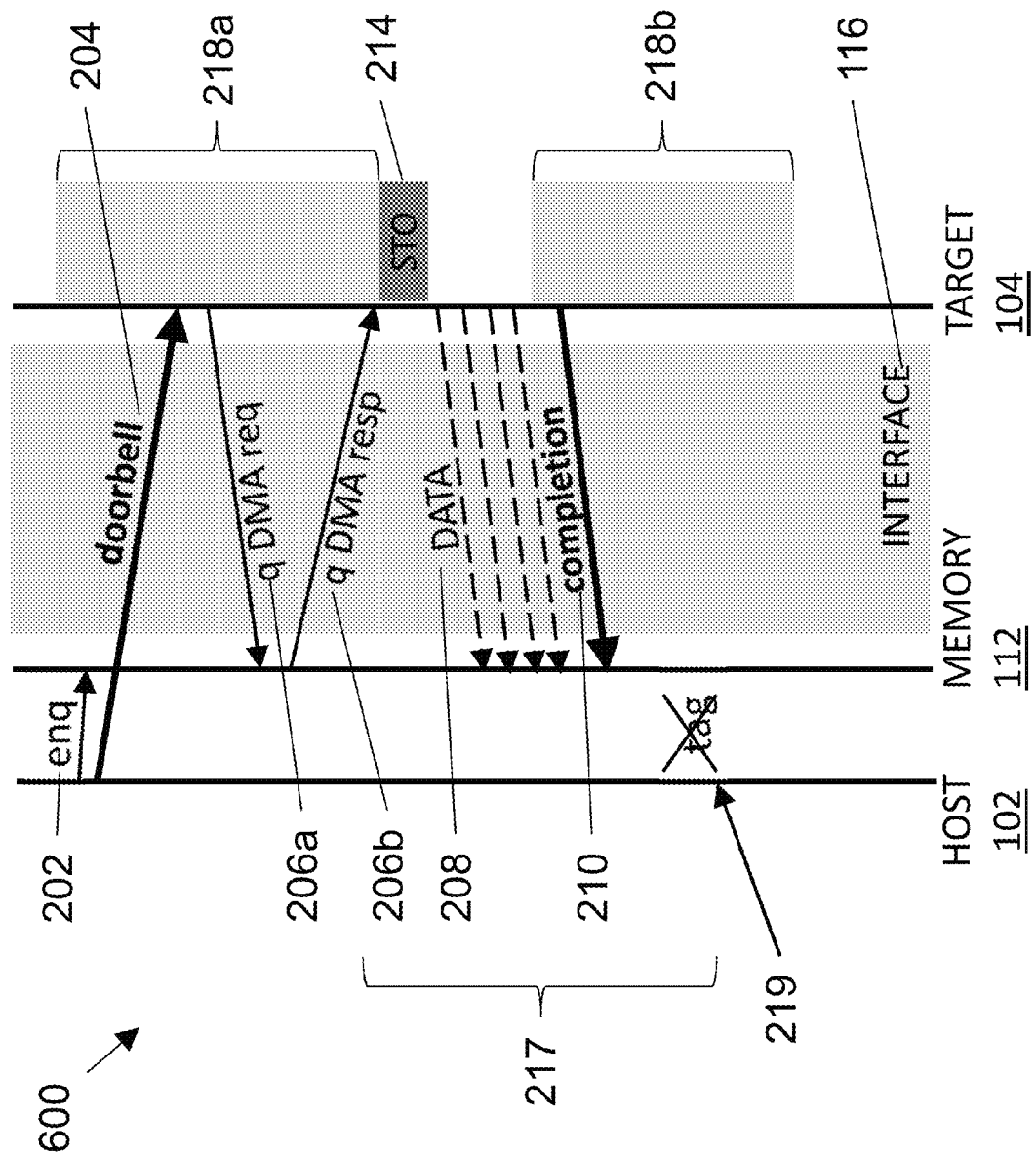
FIG. 6 illustrates an example message flow of a Non-Volatile Memory Express (NVMe)-compliant read operation, in accordance with some embodiments of the present disclosure.

FIG. 6 illustrates an example message flow 600 of a Non-Volatile Memory Express (NVMe)-compliant read operation, in accordance with some embodiments of the present disclosure. Message flow 600 includes host 102 in communication with memory 112 and with a target device, e.g., storage 122, over interface 116.

In general, to notify a process running on host 102 that a read operation has completed, an NVMe-compliant target write an entry into a "completion" queue (step 210). The completion entry can generally indicate that the target has finished retrieving the requested contents from non-volatile memory (step 214) and transmitting the requested contents to memory 112. In some embodiments, the target can be a PCI Express endpoint. The completion queue can be in memory 112 and the target can use a direct memory access (DMA) transaction to write the entry. In some embodiments, as described in connection with FIG. 2A, the target can assert an interrupt signal following the completion entry, to wake up a sleeping thread on host 102 (also shown in FIG. 2A).

As discussed in connection with FIG. 2A, after the device has completed sending the requested data, target 104 can send a completion signal (acknowledgement signal). For example, target can write an entry into a completion queue (step 210). While waiting for the requested data from storage 122, the host CPU can relinquish the control of the CPU to another process. As discussed in FIG. 2A, in some embodiments, target can further assert an interrupt that notifies the host CPU that the device has finished writing the requested data and that the CPU can return to the previous process. A thread on the CPU on host 102 can handle the interrupt. However, transmitting the completion signal and interrupt can add undesired latency and overhead into the system, in addition to undesired bandwidth over interface 116 consumed by the completion signal itself. According to alternative embodiments, an "incomplete tag" can indicate to the CPU that the requested data has not finished being transferred from storage 122. The CPU can execute a loop command (step 217), while waiting for the "incomplete tag" to disappear (step 219). This implementation, obviates the need of an interrupt signal. According to alternative embodiments, the thread that requested the data from storage 122, can enter a low-power state before entering into the loop, to provide additional power and energy savings.

This discussed process can repeat for requesting additional data from target 104, e.g., storage device 122. For example, host 102 can enqueue the next requested command. The target can send a subsequent target-initiated command request to retrieve the next queue entry, Host 102 can receive a check message from memory 112 (step 602). In response to the check message, host 102 can enqueue the next requested command (step 308). Target 104 can send a subsequent command request to retrieve the next queue entry (step 302*c*), and target 104 can receive the next requested command in response (step 302*d*). At this stage, if a packet from the previous data stream arrives out of order (step 610), the out of order arrival can corrupt the received data (step 612).

A traditional NVMe communication protocol can have further adverse performance implications in addition to bandwidth consumed by the completion signal itself.

First, a PCI Express-compliant interface can allow for out-of-order arrival of transaction-level packets (TLPs). Out of order arrival means that a possibility exists for a completion packet to settle into memory 112 (e.g., step 606), prior to all its data having arrived (e.g., step 610). Accordingly, out of order arrival (e.g., step 610) can open a window of random duration for data corruption (step 612). In some embodiments, to ensure that all the data packets have reached memory 112 prior to issuing a completion signal, target 104 can declare "strict packet ordering" for a traffic class by setting a particular bit in a TLP header. However, in general, strict packet ordering can slow down the rest of PCI Express traffic. Since PCI Express flow control can work based on prior exchange of "transaction credits," one subtle negative effect of strict ordering can be that any delayed data packet and all its successors, including the corresponding completion packet, can hold up available credits until corresponding transactions complete in turn.

Second, context switching and mode switching overhead of interrupt-based completion signaling can easily exceed the latency of a small non-volatile storage medium read operation, for example by up to about two orders of magnitude. For example, on a modern x86 processor running the LINUX operating system, two context switches between processes on the same core can take no less than 1.1 μs. Therefore, it can be imprudent to relinquish the time slice if the read from the storage device is likely to complete in less time. Even if a polling host CPU ignores the interrupt signal, the act of asserting the interrupt signal can entail transmitting a packet over the PCI Express link, potentially resulting in a small penalty on maximal payload bandwidth remaining.

Figure 7:
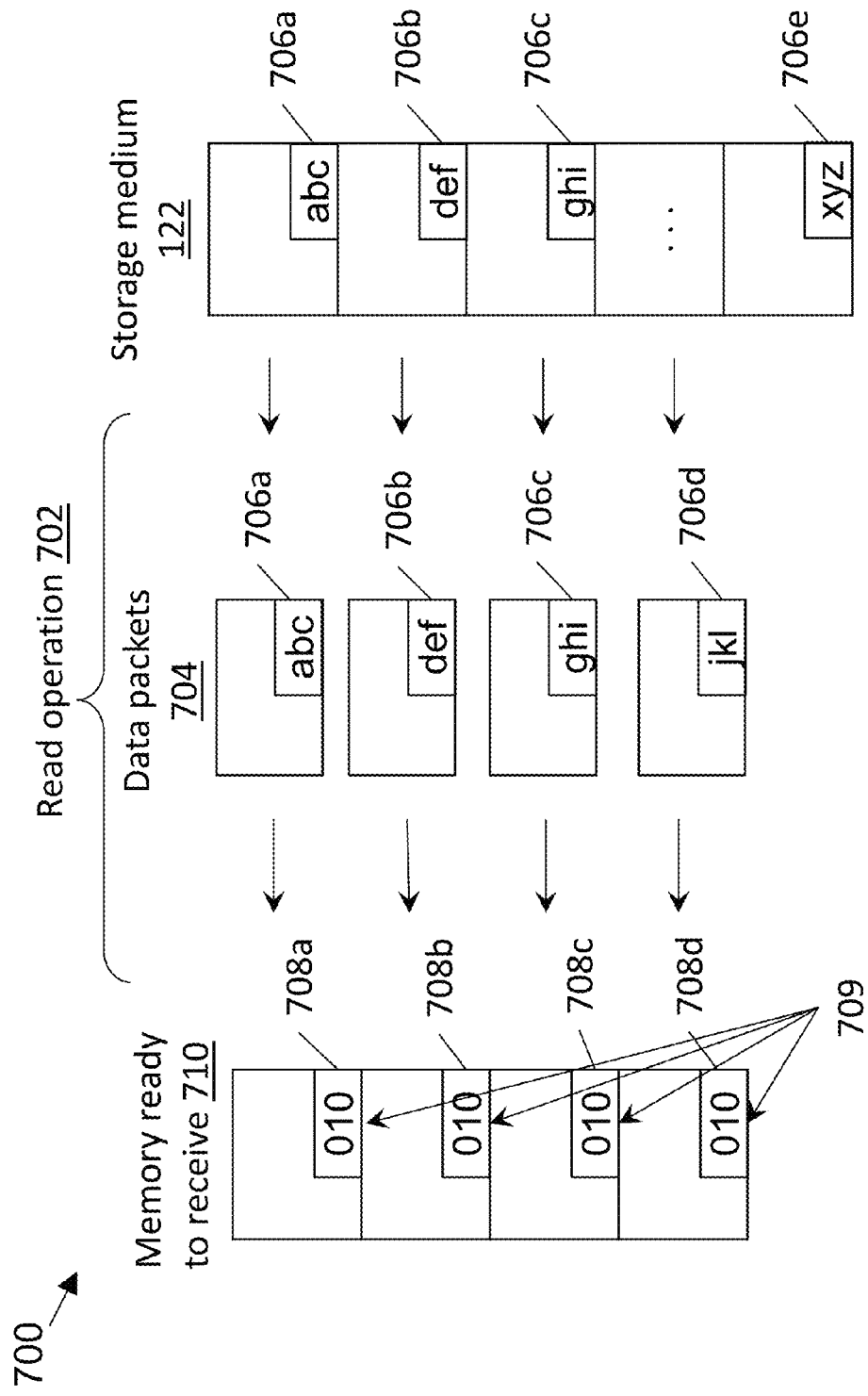
FIGS. 7-8 illustrate example block diagrams of marking memory buffers according to the communication protocol, in accordance with some embodiments of the present disclosure.

FIG. 7 illustrates an example block diagram 700 of marking memory buffers according to the communication protocol, in accordance with some embodiments of the present disclosure. Block diagram 700 includes storage medium 122 providing data packets 704 to memory 710, in response to read operation 702.

To avoid the performance penalties associated with completion signals described above, in some embodiments the communication protocol can include polling the contents of a portion of a memory receive buffer from a CPU thread. For example, detecting a change in trailing bits 709 of the memory receive buffer can signal that requested read operation 702 has completed. The content string in training bits 709 are indicated by 708*a-d*. Indeed, detecting a change in the trailing bits can be a low latency test of the arrival of a data stream into memory 710, to determine that requested read operation 702 has completed. Furthermore, this spin-wait alternation would not necessarily increase CPU utilization, since CPU cycles spent waiting for request completions would otherwise be spent on context switching and interrupt handling.

There are a few considerations to implementing this embodiment of the communication protocol. In the case of strict packet ordering, i.e., when packets from storage medium 122 are received in memory 710 in the same order as they left storage medium 122, detecting a change in the training bits of the entire buffer can reliably indicate that the entire data transfer has completed and all data packets from storage medium 122 have been copied to memory 710. Strict packet ordering can be implemented when, for example, there is reliable communication between storage medium 122 and memory 710, e.g., no data packets are dropped. However, as already mentioned, individual transaction layer packets (TLPs) that comprise a response to a single read operation 702 may arrive into the memory receive buffer out of order. Therefore, detecting a change in trailing bits of the entire memory receive buffer may not necessarily imply correct arrival of the entire buffer, because individual TLPs may not yet have arrived. In addition, the CPU is unable to know what trailing bits to expect, until the bits have already been read from the device. Accordingly, in the case of relaxed packet ordering, checking the trailing bits of every TLP can improve overall performance under certain conditions. For example, consider the case of one packet is being repeatedly garbled. To ensure "strict" ordering, the receiving end (e.g., the "root complex") must provide temporary storage for *all* the packets that are received prior to that one failing packet, which are meant to be deposited into memory after completion. This temporary storage is limited, and in practice can be very little, as in four packets total on a common PC. So If the system has a many-packet stream, and packet #1 is lost, the system can then temporarily store only the packets #2 #3 #4, leaving one slot for the retransmission of the #1. Therefore, if system keeps losing packet #1, no other packets can flow over that link. If the system allows relaxed ordering then slots #2 #3 #4 can immediately free up and allow new packets to flow regardless of when #1 actually shows up intact in the future.

Accordingly, rather than check a single portion of the entire memory receive buffer, some embodiments of the communication protocol can check a portion of each transaction layer packet (TLP)-sized chunk of the memory receive buffer. For example, the size and granularity of TLPs on a given interface link such as a PCI Express link is generally known. Therefore, in addition to checking a single portion of the entire memory receive buffer for a bit string, the communication protocol can also check a portion of every TLP-sized chunk in memory 112. In the event of out-of-order packet reception, such checking can reveal a chunk that has not yet settled (i.e., reveal a data packet that may have been reordered).

Block diagram 700 illustrates storage medium 122 containing data. The data can have portions containing bit sequences, such as bit sequences 706a-706e. When responding to read operation 702, storage medium 122 can segment the data into data packets 704 and provide the data packets to memory ready to receive 710. Data packets 704 can contain bit sequences 706a-706d. Although shown with examples of three letters and numbers, the bit sequences can be any size and contain any number of values. Memory 710 can be ready to receive data packets 704. When ready to receive, memory 710 can contain pre-determined bit strings 708a-708d. Bit strings 708a-708d can be selected to differ from bit sequences 706a-706d. Accordingly, when the memory receives data packets 704, the system can check the corresponding portions of the memory to determine whether bit strings 708a-708d have been overwritten with bit sequences 706a-706d. If bit strings 708a-708d have been overwritten, the system can determine that the requested data transaction has completed successfully. In contrast, if a bit string 708a-708d remains in the memory receive buffer, the system can determine that the requested data transaction has not yet completed (shown in FIG. 8).

Instead of searching for particular bit patterns to arrive into corresponding portions of memory for every atomic transfer, the communication protocol can instead pre-select a bit string, also referred to as an "incomplete tag" or "dirty tag." The bit string can be a pre-selected pattern expected not to appear in the data that is anticipated to arrive into memory receive buffer 710 from storage medium 122. The communication protocol can then write bit string 708a-708d to memory receive buffer 710, prior to initiating read operation 702. To determine a completion signal, the system can look for a disappearance of bit string 708a-708d from a corresponding portion of the data packets stored in memory receive buffer 710. In this way, the communication protocol can leverage a relatively faster interface from CPU to memory, and avoid sending further packets over the relatively slower PCI Express interface link.

Figure 8:
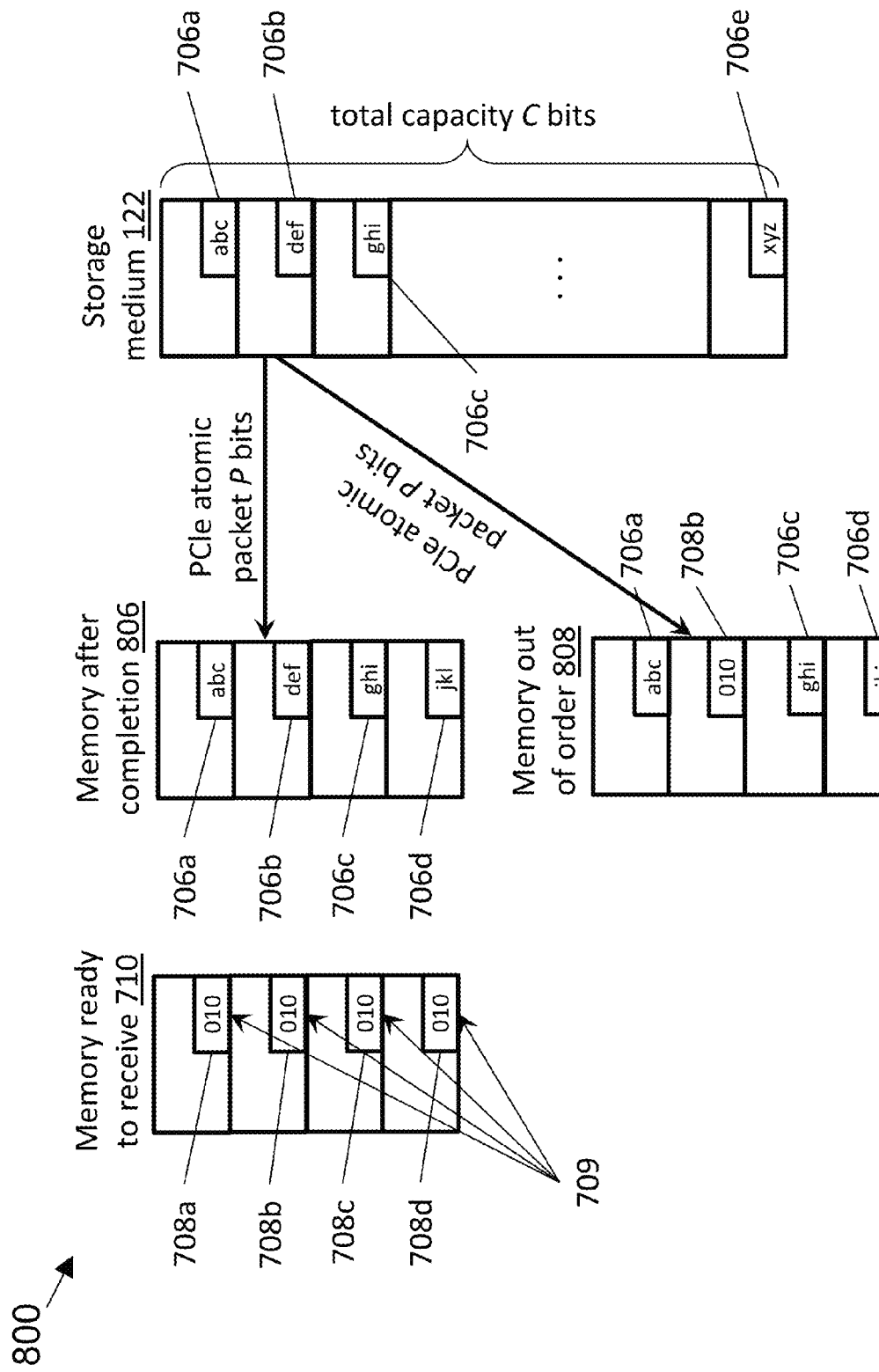

FIG. 8 illustrates another example block diagram 800 of marking memory buffers according to the communication protocol, in accordance with some embodiments of the present disclosure. FIG. 8 includes storage medium 122 in communication with memory ready to receive 710, memory after completion 806, and memory out of order 808.

Block diagram 800 illustrates storage medium 122 containing data. The data can have portions containing bit sequences, such as bit sequences 706a-706e. When responding to a read operation, storage medium 122 can segment the data into data packets. Storage medium 122 can transmit the data packets over an interface such as PCIe. Each atomic packet can contain P bits. Memory ready to receive 710 can be ready to receive the data packets over an interface such as PCIe. When ready to receive, memory ready to receive 710 can contain pre-determined bit strings 708a-708d. Bit strings 708a-708d can be pre-selected to be different from bit sequences 706a-706e. Accordingly, the memory can receive the data packets.

If the system completes transmission of the data stream of packets successfully, memory after completion 806 can result. In memory after completion 806, the system can check the corresponding portions of memory after completion 806 to determine whether bit strings 708a-708d have been overwritten with bit sequences 706a-706d. Since bit strings 708a-708d have been overwritten in memory after completion 806, the system can determine that the requested data transaction has completed successfully, without having to receive a further completion signal packet over the relatively slower PCIe interface.

In contrast, in memory out of order 808, bit string 708b remains in the memory receive buffer. The system can check the corresponding portions of memory out of order 808, and the system can determine that the presence of bit string 708b indicates that a data packet of the data stream is arriving out of order at memory out of order 808. Accordingly, the system can determine that the requested data transaction has not yet completed, again without having to wait for a further data packet over the relatively slower PCIe interface or having to enable strict ordering over the PCIe interface.

Some embodiments of the command protocol can select the bit string used for the incomplete tag or dirty tag to be different from corresponding portions of arriving transaction layer packets (TLPs). For example, the system can select a bit string of length greater than $\log_2(C/P)$ bits, where C represents a total capacity of storage medium 122 and P represents a size of one transaction layer packet (TLP). With a bit string of length greater than $\log_2(C/P)$ bits, the system can select a bit sequence such that no TLP arriving from storage medium 122 at that time would be expected to have a bit sequence in the corresponding portion that matches the selected bit string. This characteristic of storage device interfaces as used in the communication protocol is different from, for example, traditional network interface protocols. In traditional network interface protocols, the Host 102 generally does not have knowledge of the content of arriving data, even in principle, and therefore is unable to pre-select an appropriate bit string.

In some embodiments, selecting the bit string for the incomplete tag or dirty tag can include selecting the bit string at random. Although probabilistic, a random selection can be adequate for the vast majority of computing applications without hard real time latency bounds.

An example can illustrate the adequacy of random selection. Assume a device with 128 GiB of PCM and a TLP payload size of 128 B. Dividing device capacity C=128 GiB by TLP payload size P=128 B yields $\log_2(128 \text{ GiB}/128 \text{ B})=30$. Accordingly, there can be $2^{30}$ or fewer possible values for a portion of a given TLP-sized portion of any given transfer. If the system sets the size for the incomplete tag at 32 bits, a randomly generated 32-bit pattern could then have at most $2^{30}/2^{32}=25\%$ chance of being repeated somewhere on storage medium 122. Furthermore, this would be the worst case scenario in which every one of the $2^{30}$ possible patterns is present on the device. If the random choice was unlucky and the generated pattern were indeed present on the device, that read operation could get stuck since the arrival of that packet could go unnoticed, i.e., there could be a "collision."

In some embodiments, selecting the bit string for the incomplete tag or dirty tag can include selecting the length of the bit string such that the system can determine the probability of collision to be sufficiently low. In some embodiments, if the system encounters a collision, the communication protocol can time out a "stuck" read operation and select a subsequent new bit string at random before retrying. In further embodiments, the system can determine a duration for the time out to be the product of a maximum queue depth and a maximum latency to complete a single read operation.

In some embodiments, selecting the bit string for the incomplete tag or dirty tag can include additional aspects. For example, for applications with hard real-time latency bounds, selecting the bit string can include determining a value for the incomplete tag value so that no collision is possible. In some embodiments, the system can select a value for the bit string at storage medium 122 during first power-up. In other embodiments, the system can select a new value for the bit string whenever a write to storage medium 122 invalidates the existing selected value. In further embodiments, the target device can determine values for the bit string at random, and compare the determined values for the bit string internally with the current contents of storage medium 122. Furthermore, this comparison can avoid incurring communication overhead over the PCIe interface, as accesses to storage medium 122 could be confined to the storage medium controller on the target device. In some embodiments, the target device can monitor write operations, for example by using or providing additional computing resources. The monitoring can track potential values for the bit string, based on values currently in the stored data so that selection of a new bit string can complete in substantially constant time (e.g., $O(1)$).

Figure 9:
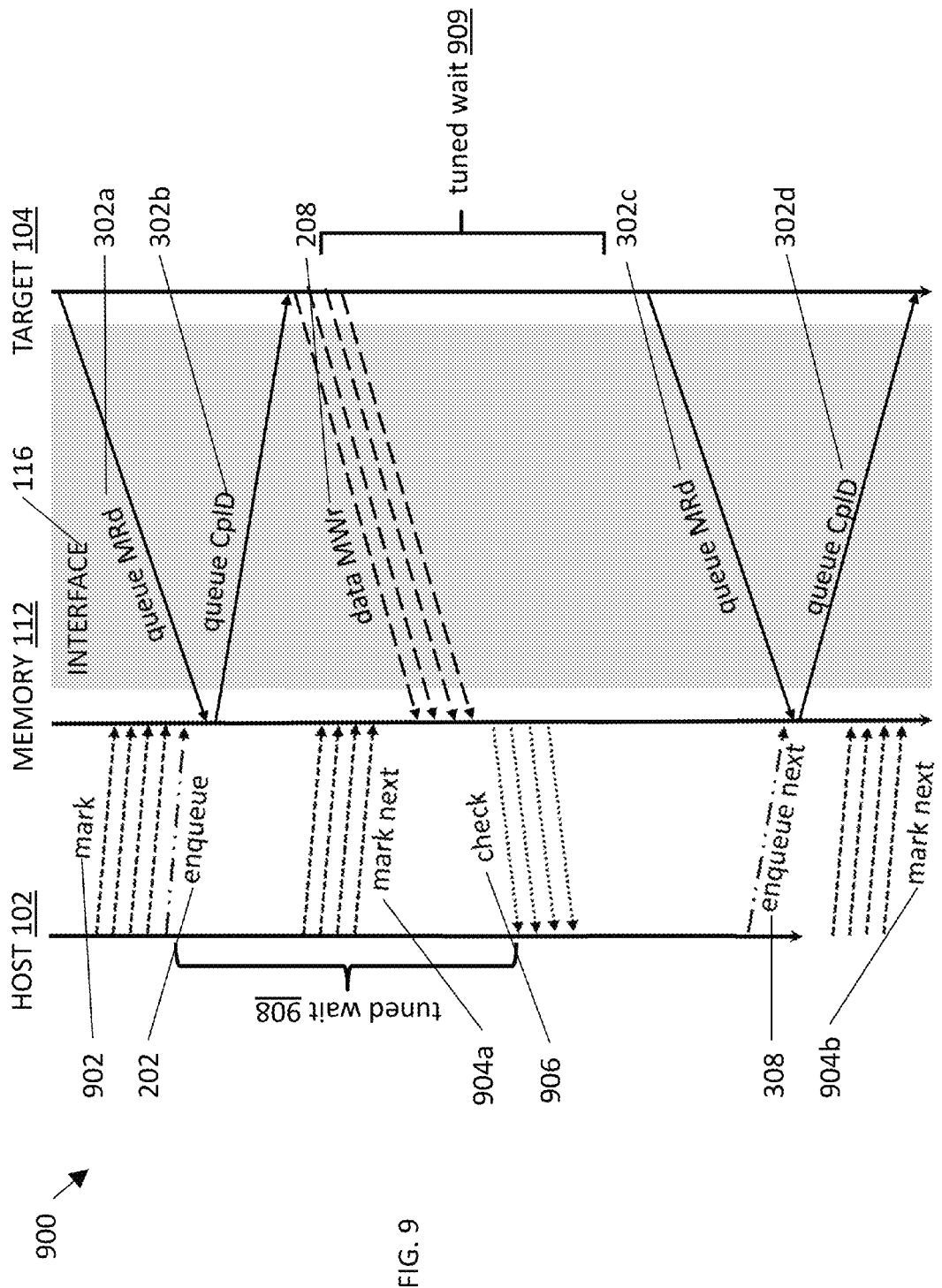
FIGS. 9-11 illustrate example message flows of the communication protocol, in accordance with some embodiments of the present disclosure.

FIG. 9 illustrates an example message flow 900 of the communication protocol, in accordance with some embodiments of the present disclosure. Message flow 900 includes host 102 in communication with memory 112 and with target 104 over interface 116. Message flow 900 generally illustrates marking memory buffers according to the communication protocol.

Host 102 can mark portions of a receive buffer in memory 112 using a selected bit string (step 902). The bit string can represent an "incomplete" tag or "dirty" tag chosen to have a value that differs from an anticipated value of portions of received data from a storage medium in communication with target 104. In some embodiments, the selected bit string can have length greater than $\log_2(C/P)$ bits, where C represents a total capacity of storage medium 122 and P represents a size of one transaction layer packet (TLP). In some embodiments, host 102 can select a value for the bit string at random, upon a first power-up of the system, or whenever a write to the storage medium invalidates an existing selected value for the bit string.

Host 102 can enqueue a command such as a read operation (step 202). Target 104 can send a target-initiated command request, to request one or more commands in the read queue in memory 112 (e.g., host DRAM) (step 302a). Upon receiving the requested queue entry (step 302b), target 104 can send the requested data to memory 112 over interface 116 (step 208).

Host 102 can also mark additional portions of the receive buffer of memory 112 in preparation for detecting completion of a requested transaction (step 904a). Upon receiving the requested data (step 208), host 102 can check corresponding portions of the receive buffer in memory 112 to confirm whether the data transaction completed successfully (step 906). If the bit strings used to mark the receive buffer of memory 112 have been overwritten with different bit sequences, host 102 can conclude that the data transaction completed successfully. In this way, the communication protocol can leverage a relatively faster interface from host 102 to memory 112, and avoid sending further messages or packets over the relatively slower interface 116.

Target 104 can also determine and tune an amount of time to wait (step 908), an expected amount of time for target 104 to complete transmission of the requested data in response to the enqueued command (step 208) and initiate a subsequent command request to request one or more subsequent commands in the read queue in memory 112 (step 302c). That is, target 104 can determine not to use the interface (or bus) with requests for new commands if target 104 knows that there are not any requests. This concept of "tuned wait" can also be applied to the timing diagrams shown in FIGS. 3 and 10.

Host 102 can proceed to enqueue a subsequent command (step 308). Target 104 can initiate a subsequent command request to request one or more subsequent commands in the read queue in memory 112 (step 302c) and receive the requested queue entry (step 302d). Host 102 can further mark the next portions of the receive buffer in memory 112 in preparation for determining whether a subsequent read request completed successfully (step 904b). Under alternative embodiments, the system can impose a tuned delay (909) before issuing subsequent read command DMA requests (302C). When the system knows or there is high probability, that the process issuing requests is not capable of issuing these requests faster than a particular time interval, then imposing the tuned delay (909) can improve average system performance.

Figure 10:
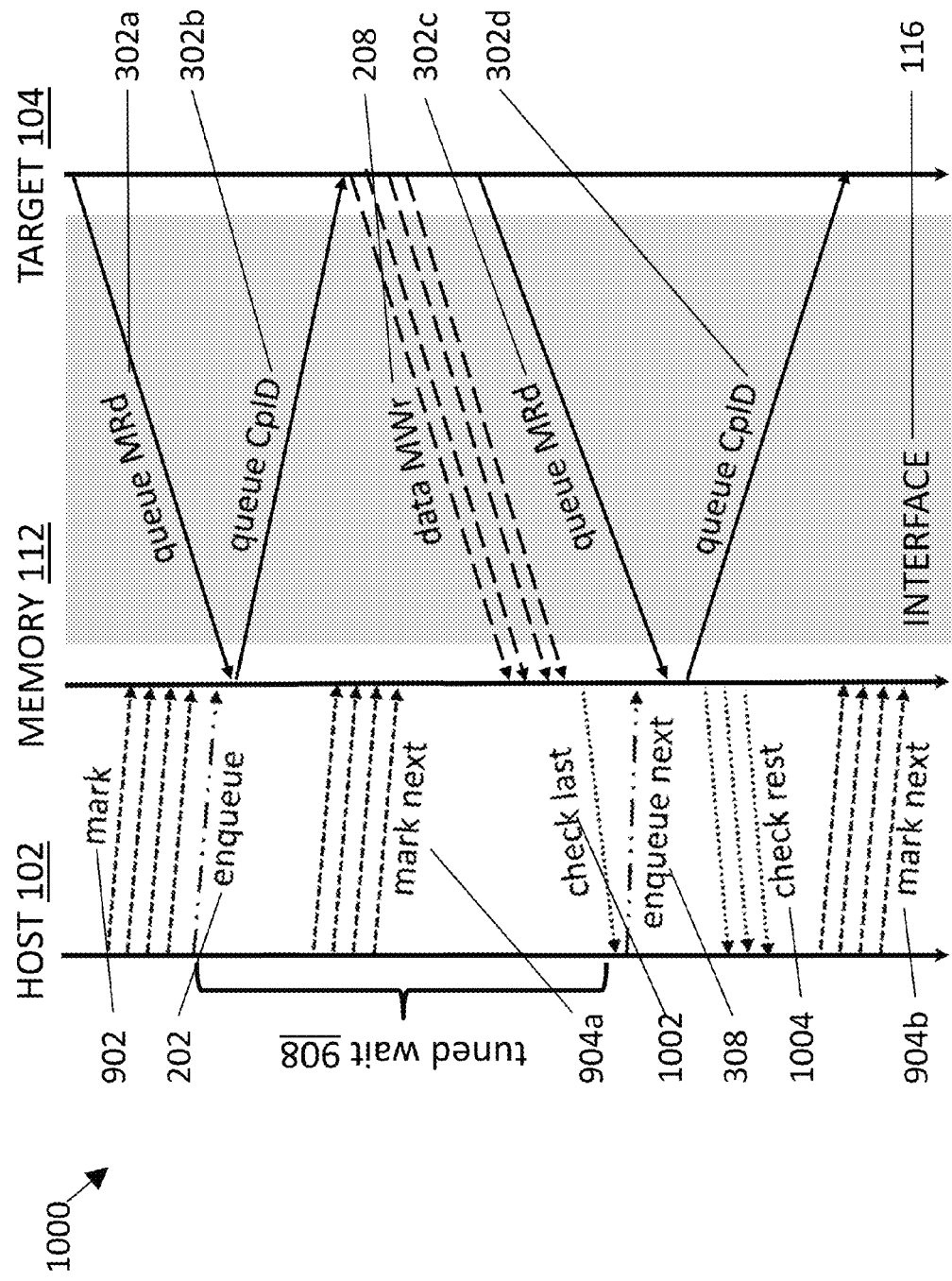

FIG. 10 illustrates an example message flow 1000 of the communication protocol, in accordance with some embodiments of the present disclosure. Message flow 1000 includes host 102 in communication with memory 112 and with target 104 over interface 116. Message flow 1000 generally illustrates marking memory buffers in a pipelined fashion according to the communication protocol.

Host 102 can mark portions of a receive buffer in memory 112 using a selected bit string (step 902). The bit string can represent an "incomplete" tag or "dirty" tag chosen to have a value that differs from an anticipated value of portions of received data from a storage medium in communication with target 104. In some embodiments, the selected bit string can have length greater than $\log_2(C/P)$ bits, where C represents a total capacity of storage medium 122 and P represents a size of one transaction layer packet (TLP). In some embodiments, host 102 can select a value for the bit string at random, upon a first power-up of the system, or whenever a write to the storage medium invalidates an existing selected value for the bit string.

Host 102 can enqueue a command such as a read operation (step 202). Target 104 can send a target-initiated command request, to request one or more commands in the read queue in memory 112 (e.g., host DRAM) (step 302a). Upon receiving the requested queue entry (step 302b), target 104 can send the requested data to memory 112 over interface 116 (step 208).

Host 102 can also mark additional portions of the receive buffer of memory 112 in preparation for detecting completion of a requested transaction (step 904a). Upon receiving the requested data (step 208), host 102 can check corresponding portions of the receive buffer in memory 112 to confirm whether the last packet of the data transaction were received successfully (step 1002). If the bit strings used to mark the receive buffer of memory 112 for the initial data packets have been overwritten with different bit sequences, host 102 can conclude that at least the initial packets of the data transaction completed successfully. In this way, the communication protocol can leverage a relatively faster interface from host 102 to memory 112, and avoid sending further messages or packets over the relatively slower interface 116.

After completion of the check (step 1002), host 102 can enqueue a subsequent command (step 308). Target 104 can initiate a subsequent command request to request one or more subsequent commands in the read queue in memory 112 (step 302c) and receive the requested queue entry (step 302d).

Host 102 can proceed to check the remaining portions of the receive buffer in memory 112 to confirm whether the remaining packets of the data transaction were received successfully. If the bit strings used to mark the receive buffer of memory 112 for the remaining data packets have been overwritten with different bit sequences, host 102 can conclude that the data transaction completed successfully. As discussed above, in the case of relaxed packet ordering, i.e., there is no constraints in receiving the packets in host memory 112 in order, the trailing bits of every packet can be checked to determine whether the data transfer has been completed. However, if the data packets rarely arrive in host memory 112 out-of-order, then the checking of the trailing bits can be removed from the main latency loop (step 1004). Instead, the trailing bits of the received packets can be checked only in the end.

Host 102 can also determine and tune an amount of time to wait, between initial enqueuing of the requested command (step 902) and the checking of corresponding portions of the receive buffer in memory 112 for at least the initial data packets (step 1002). In some embodiments, the wait time can be determined by host 102 based on an expected amount of time for target 104 to complete transmission of the requested data in response to the enqueued command (step 208). Under alternative embodiments, the host process can be written such that the host 102 can execute different instructions in the thread instead of waiting for the transmission completion. For example, the process can interleave two or more read command submissions, such that while one read command waits for the requested data, the second one is processed. Accordingly, the host CPU can be used for useful command execution, instead of dissipating power in a loop waiting for the read completion.

Host 102 can further mark the next portions of the receive buffer in memory 112 in preparation for determining whether a subsequent read request completed successfully (step 904b).

Figure 11:
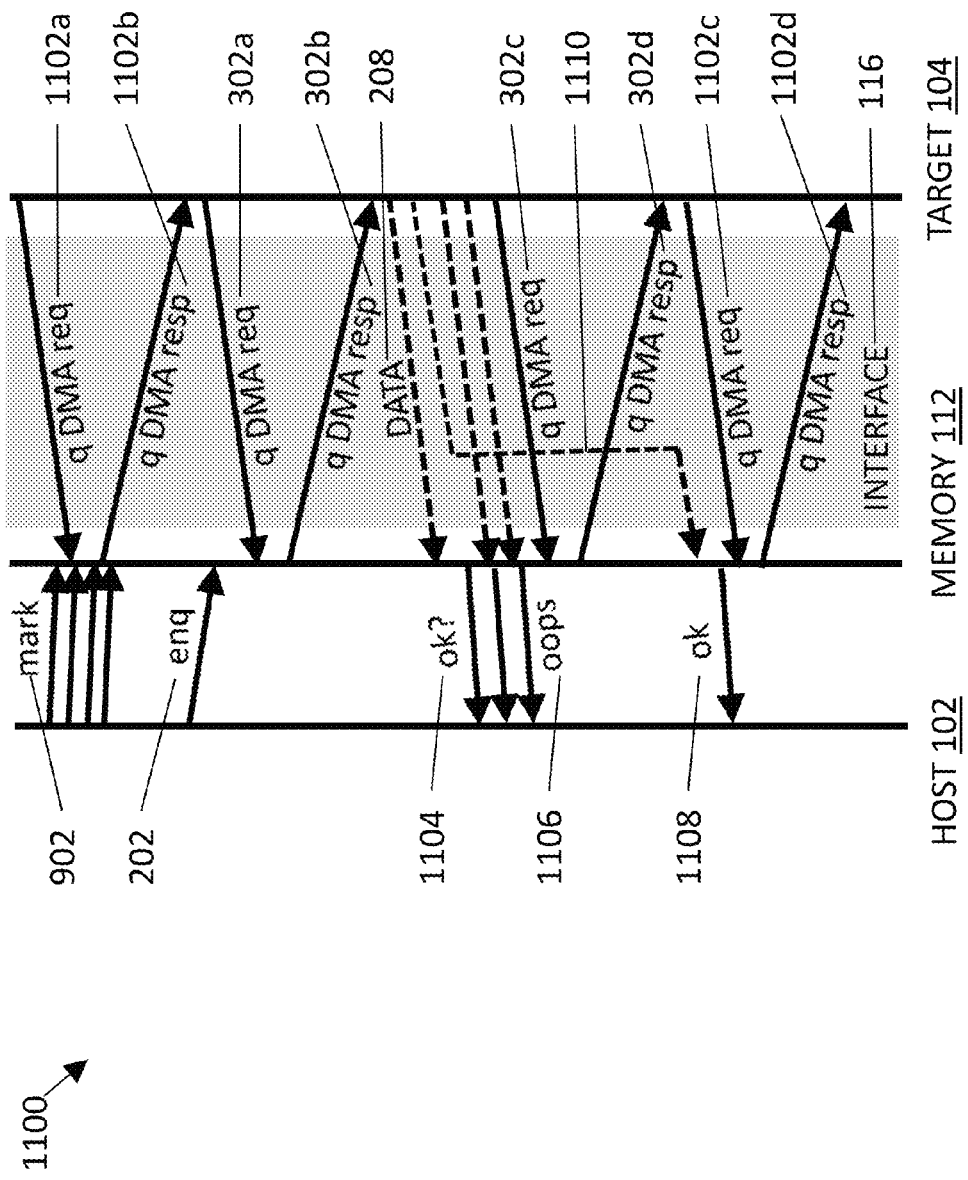

FIG. 11 illustrates an example message flow 1100 of the communication protocol, in accordance with some embodiments of the present disclosure. Message flow 1100 includes host 102 in communication with memory 112 and with target 104 over interface 116. Message flow 1100 generally illustrates marking memory buffers according to the communication protocol in response to a data packet arriving out of order.

In some embodiments, the communication protocol can determine completion of a data transmission by marking each TLP-sized chunk of a receive buffer in memory 112 with a bit string (step 902), and then monitoring for disappearance of the bit strings (step 1104). In the case of out-of-order arrival (e.g., message 1110), host 102 can find the bit string remaining in one of the chunks in the receiver buffer of memory 112 (step 1106). The remaining bit string can prompt host 102 to wait longer to allow the data to settle (step 1108).

Specifically, host 102 can mark portions of a receive buffer in memory 112 using a selected bit string (step 902). The bit string can represent an "incomplete" tag or "dirty" tag chosen to have a value that differs from an anticipated value of portions of received data from a storage medium in communication with target 104. Storage medium 122 can send a target-initiated command request, to request one or more commands in the read queue in memory 112 (e.g., host DRAM) (step 1102a). At this point, host 102 may not yet have queued any commands into the read queue in memory 112. Accordingly, target 104 may receive an empty response from the read queue (step 1102b).

Host 102 can enqueue a command such as a read operation (step 202). Target 104 can send another endpoint-initiated command request, to request one or more commands in the read queue in memory 112 (e.g., host DRAM) (step 302a). Upon receiving the requested queue entry (step 302b), target 104 can send the requested data in packets to memory 112 over interface 116 (step 208).

Memory 112 can determine a completion signal and notify host 102 whether the complete data stream has been received in the transaction, by checking for the presence of corresponding bit strings in the portions of the receive buffer of memory 112 (step 1104). If a pre-determined bit string remains in a portion of the receive buffer of memory 112 when the bit string would be expected to have been overwritten, then memory 112 can determine that an out-of-order arrival has happened (step 1106).

In the meantime, target 104 can continue to send target-initiated command requests (step 302c) and receive queue entries in response (step 302d). When memory 112 receives the out-of-order arrival (message 1110), host 102 queries the memory 112 whether the data transmission has completed successfully (step 1108). Although the result can be a longer wait for the data to settle, the result can be a successful data transaction rather than unwanted corrupted data.

Target 104 can send a subsequent target-initiated command request to request one or more subsequent commands in the read queue in memory 112 (step 1102*c*) and receive the requested queue entry (step 1102*d*).

Figure 12:
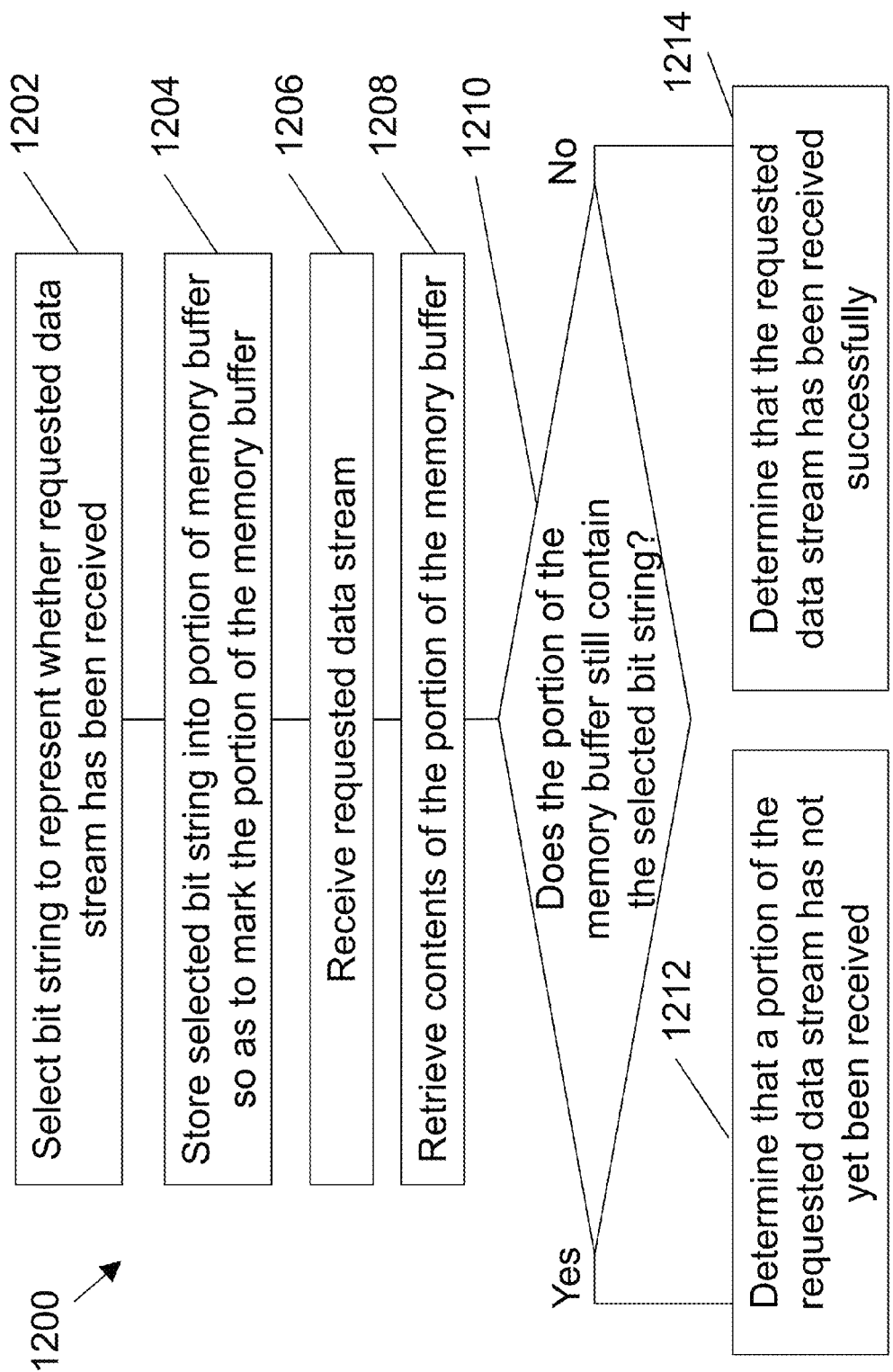
FIG. 12 illustrates an example method for the communication protocol, in accordance with some embodiments of the present disclosure.

FIG. 12 illustrates an example method 1200 for the communication protocol, in accordance with some embodiments of the present disclosure. Method 1200 can include selecting a bit string to represent whether a requested data stream has been received (step 1202); storing the selected bit string into a portion of a memory buffer, so as to mark the portion of the memory buffer (step 1204); receiving the requested data stream (step 1206); retrieving the contents of the memory buffer (step 1208); determining whether the portion of the memory buffer still contains the selected bit string (step 1210); if the portion of the memory buffer still contains the selected bit string, determining that a portion of the requested data stream has not yet been received (step 1212); otherwise, determining that the requested data stream has been received successfully (step 1214).

Selecting the bit string to represent whether the requested data stream has not yet been received (step 1202) can include selecting the bit string to be different from corresponding portions of arriving transaction layer packets (TLPs). For example, the system can select a bit string of length greater than $\log_2(C/P)$ bits, where C represents a total capacity of a storage medium and P represents a size of one transaction layer packet (TLP). With a bit string of length greater than $\log_2(C/P)$ bits, the system can always select a bit sequence such that no TLP arriving from the storage medium at that time would have a bit sequence in the corresponding portion that matches the selected bit string. This characteristic of storage device interfaces as used in the communication protocol is different from, for instance, traditional network interface protocols. In traditional network interface protocols, the system generally is not privy to the content of arriving data, even in principle.

In some embodiments, selecting the bit string can include selecting the bit string at random. Selecting the bit string can also include selecting the length of the bit string such that the system can determine the probability of collision to be sufficiently low. In further embodiments, if the system encounters a collision, the communication protocol can time out a "stuck" read operation and select a subsequent new bit string at random before retrying. In some embodiments, the system can determine a duration for the time out to be the product of a maximum queue depth and a maximum latency to complete a single read operation.

In some embodiments, selecting the bit string can include determining a value for the incomplete tag value so that no collision is possible, for applications with hard real-time latency bounds. In some embodiments, the system can select a value for the bit string at the storage medium during first power-up. In other embodiments, the system can select a new value for the bit string whenever the system determines that a write to the storage medium has invalidated the existing selected value. In further embodiments, the target device can determine values for the bit string at random, and compare the determined values for the bit string internally with the current contents of the storage medium.

Storing the selected bit string into a portion of the memory buffer so as to mark the portion of the memory buffer (step 1204) can include storing the selected bit string as trailing bits into a receive buffer associated with the memory. As discussed above, under strict packet ordering checking the trailing bits of the entire data transfer can indicate the completion of a data transfer from storage into host memory, without the need of a completion signal transmitted from storage over the communication medium. Under relaxed packet ordering, it can be efficient to check the trailing bits of every TLP to detect when the entire data transfer is completed from storage into the host memory. Other portions or regions of the receive buffer can also be used, such as storing the bit string into leading bits of the receive buffer.

Receiving the requested data stream (step 1206) can include receiving the requested data stream segmented into transaction-layer packets (TLPs). Retrieving the contents of the portion of the memory buffer (step 1208) can include retrieving the contents of TLP-sized or sub-TLP-sized chunks of the memory buffer corresponding to data packets that have been received thus far.

Determining whether the portion of the memory buffer still contains the selected bit string (step 1210) can include checking the trailing bits of TLP-sized chunks of the memory buffer that correspond to the received data packets (TLPs). If the portion of the memory buffer still contains the selected bit string (step 1210: Yes), the system can determine that a portion of the requested data stream has not yet been received. For example, if a TLP-sized chunk in the memory buffer still contains the selected bit string or "incomplete tag," the system can conclude that at least one data packet (TLP) has not yet been received. If all portions of the memory buffer contain bit sequences that differ from the selected bit stream (step 1210: No), the system can determine that the requested data stream has been received and completed successfully.

Performance

Figure 13:
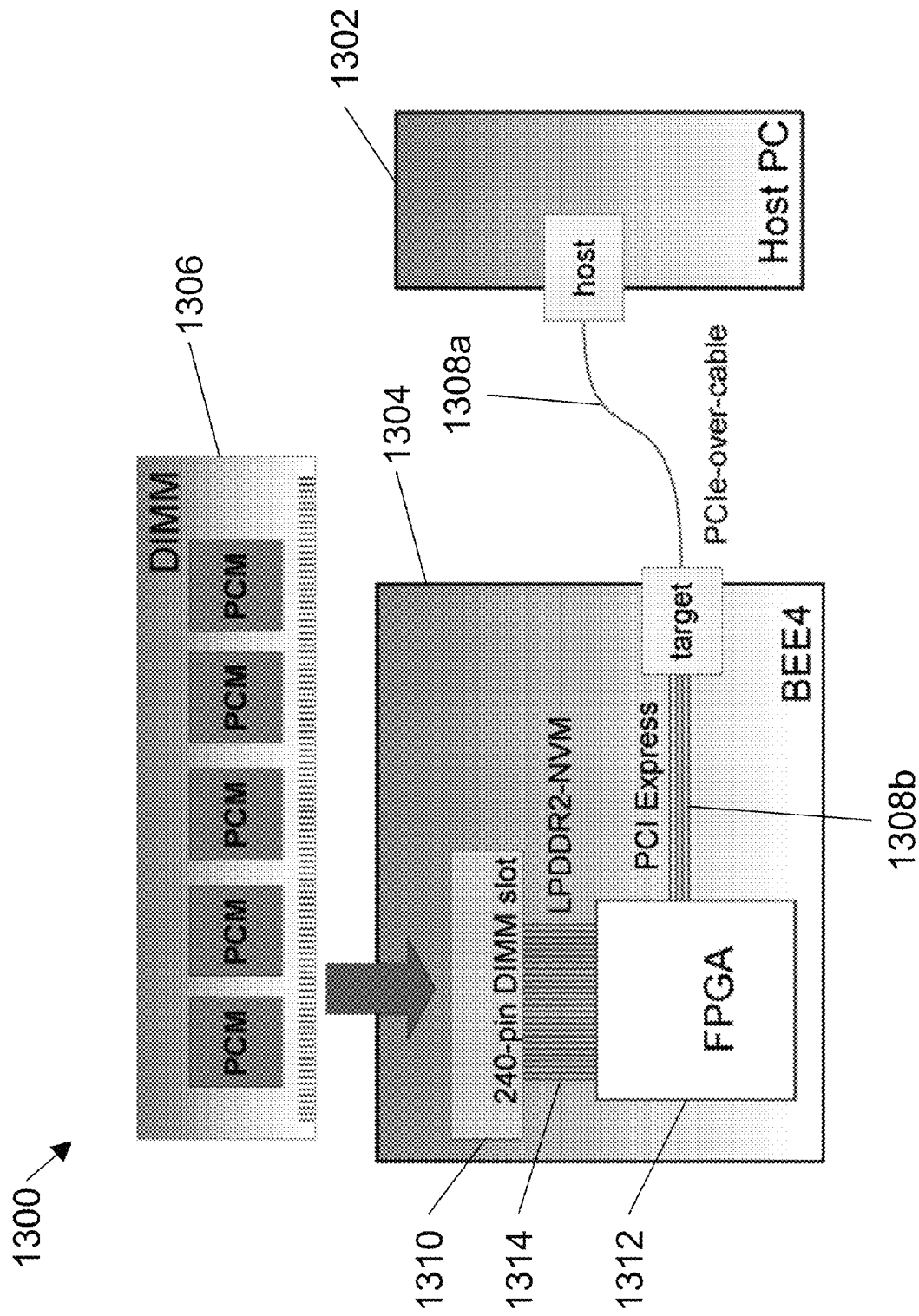
FIG. 13 illustrates an example prototype implementing the communication protocol, in accordance with some embodiments.

FIG. 13 illustrates an example prototype 1300 implementing the communication protocol, in accordance with some embodiments. To test the communication protocol, Applicants constructed prototype 1300. Prototype 1300 includes host 1302 in communication with target 1304 over interfaces 1308*a*-1308*b*. Target 1304 also includes non-volatile memory storage medium 1306 and dual-inline memory module (DIMM) slot 1310, FPGA 1312, and LPDDDR2-NVM bus 1314.

Target 1304 can include a BEE4 FPGA platform from BEEcube, Inc., Fremont, Calif., equipped with custom-built dual-inline memory module (DIMM) card 1306 containing 5 Gib of Phase Change Memory (Micron NFROA2B0D125C50). The NVM device exposed a 4-lane 5 GT/s ("gen2") PCI Express link 1308*b* from Virtex6 FPGA 1312 running a custom memory controller that communicated with the PCM chips over LPDDR2-NVM bus 1314. Example host systems used for testing included a Dell R720 server with an Intel Xeon E5-2690 CPU (Sandy Bridge-EP, TurboBoost to 3.8 GHz) and a Z77 Extreme4-M motherboard with an Intel i7-2600 CPU (Sandy Bridge, TurboBoost to 3.4 GHz). NVM device 1306 was normally connected to PCI Express lanes 1308*b* on the CPU dies. Alternatively, on the Z77 host the prototype could use the lanes connecting to the Z77 chipset to measure the impact of the retransmission. All measurements were performed on LINUX kernel version 3.5 (Ubuntu and Fedora distributions).

Figure 14:
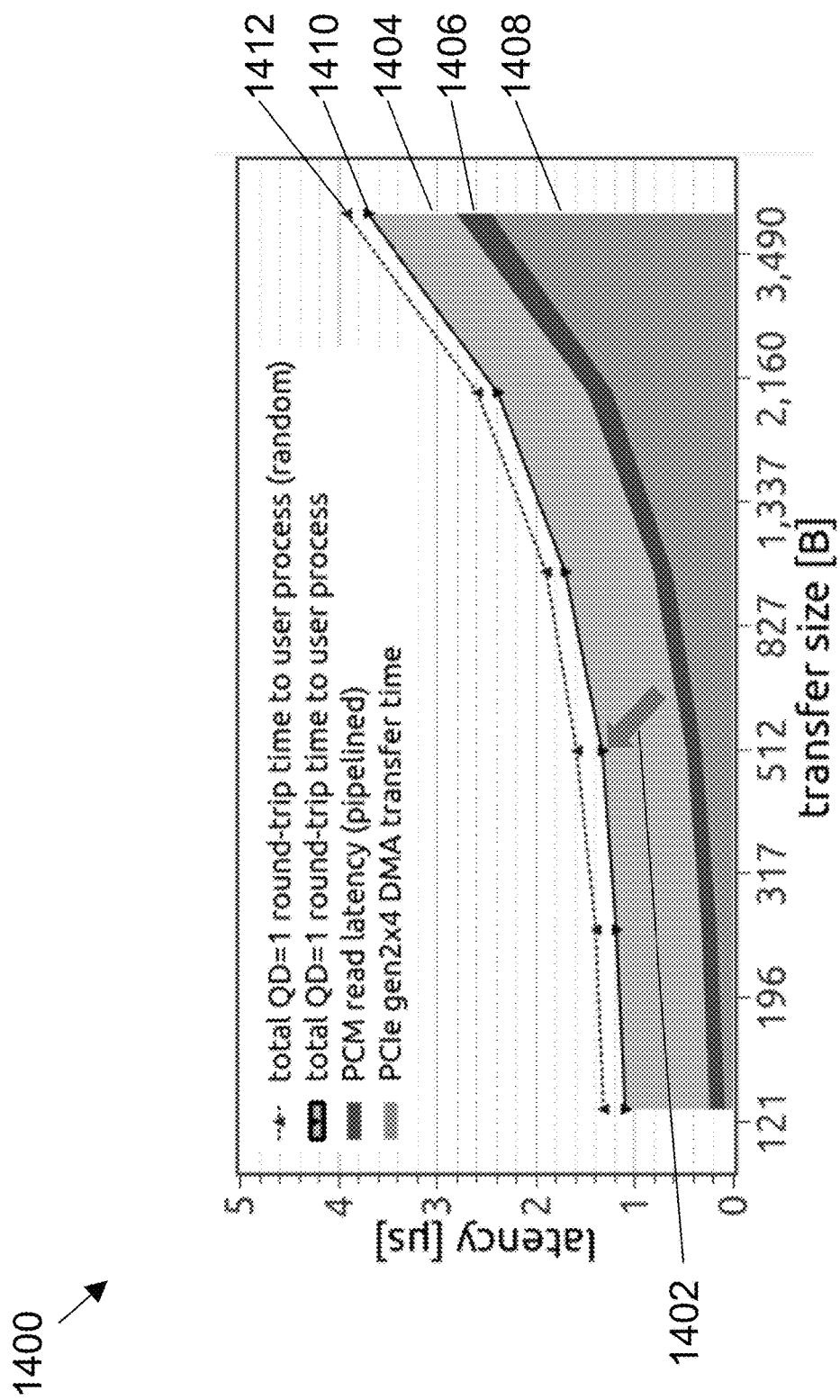
FIG. 14 illustrates an example graph of average latency of a read operation using the communication protocol, in accordance with some embodiments of the present disclosure.

FIG. 14 illustrates an example graph 1400 of average latency of a read operation using the communication protocol, in accordance with some embodiments of the present disclosure. Graph 1400 illustrates an average latency of a small random read operation when using the communication protocol at queue depth 1.

The protocol first exercised the bare communication protocol from a user space process by mmap( )-ing a kernel buffer where the queues and receive buffer locations were pre-allocated. This experimental setup allowed measurement of raw performance of the communication protocol, without overhead of mode switching or context switching. Graph 1400 illustrates example results for different transfer sizes. The prototype was designed so that the bandwidth of data retrieval from storage medium matched that of PCI Express transmission. Therefore, only the initial PCM row activation and local LPDDR2-NVM memory bus overhead (1406) contributed to irreducible protocol latency; the remainder is pipelined with PCI Express transfer (1408). The remaining component (1404) measures PCI Express packet handling and command parsing, in addition to the polling from both ends of the link.

When the prototype exercised the communication protocol in a tight loop, or with predictable timing in general, the prototype could adjust target polling to anticipate times of arrival of new commands into the read queue, so that a new command got picked up by the queue DMA request soon after its arrival into the queue. The total round-trip latency for this use case (1410) was measured as the inverse of the total number of read operations executed in a tight loop. For traditional 512 B blocks (1402) the total latency seen by a user-space process averaged 1.4 µs, or over 700,000 IOPS.

If the prototype fully randomizes read command arrival times so that no predictive optimization of target-driven queue polling is possible, there can be additional latency incurred by the average delay between the arrival of a read command into the queue and the time when the next queue DMA hits. For this use case the prototype measured completion latencies using Intel CPU's time stamp counter (1412).

TABLE 1

Breakdown of contribution to average round-trip latency of communication protocol for 4 kiB random reads at queue depth 1

| component | latency [µs] | kIOPS |
|---|---|---|
| data transfer (4 kiB) | 2.432 | |
| PCM read | 0.368 | |
| protocol + command parsing | 0.863 | 273 (user space process) |
| block driver | 0.99 | |
| read( ) call (kernel entry/exit) | 1.17 | |
| fio | 0.506 | 158 (Linux block device driver) |

The prototype also included constructing a lightweight block device driver to measure the impact of kernel entry and exit. The prototype driver derived from the LINUX ramdisk device example. The prototype limited read block size to 4 kiB. Table 1 lists additional latencies. One memory-to-memory copy of the retrieved block accounts for a small fraction of the time spent inside the block driver. Furthermore, the tool used for measuring the latency of the block device, fio, contributed a significant amount of its own latency to these measurements. For comparison, another NVMe-compliant device accessed through a LINUX NVMe device driver under similar conditions reached 78 kIOPS at queue depth 1, nearly 13 µs per 4 kiB read operation.

The latencies measured on the i7 system turned out to be comparable to those on the E5 server system when the prototype was connected to CPU lanes. Routing the packets through the Z77 chipset resulted in about 2 µs of additional latency per PCI Express round trip.

Power and Congestion Considerations

Figure 15:
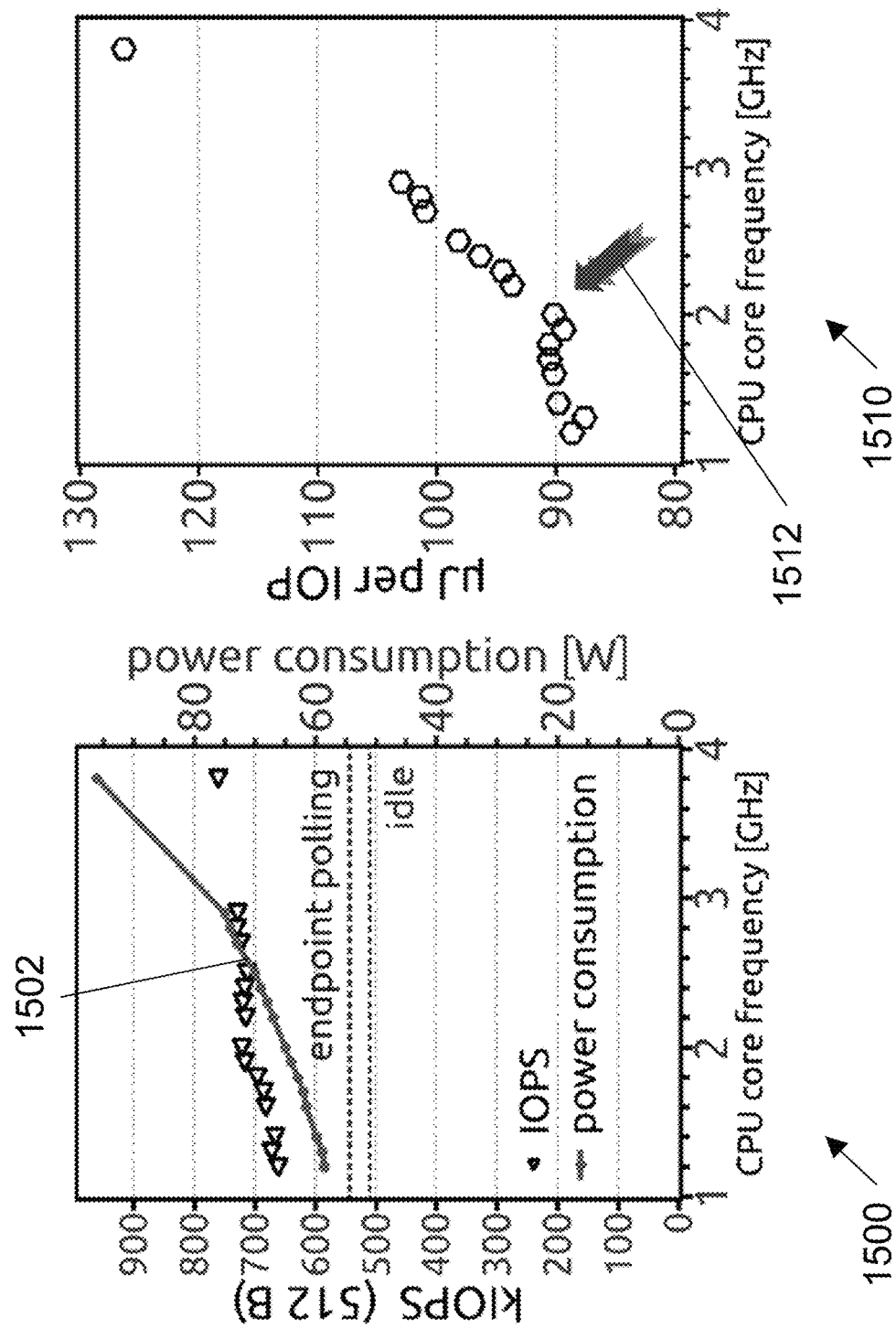
FIG. 15 illustrates example graphs of power usage of the communication protocol, in accordance with some embodiments of the present disclosure.

FIG. 15 illustrates example graphs 1500, 1510 of power usage of the communication protocol, in accordance with some embodiments of the present disclosure. Graphs 1500, 1510 illustrate the dependence of communication protocol performance and system power usage on clock frequency of the CPU core doing a tight loop.

One area for performance evaluation with a communication protocol that queries the host DRAM for new commands substantially periodically or continuously is whether resources are wasted at idle. To better understand the magnitude of this component relative to the baseline idle consumption of a modern server configuration, graphs 1500, 1510 illustrate disabling all but one core on the single socket populated by the E5-2690 on the Dell R720 server equipped with 16 GiB of DDR3-1600 DRAM.

Graphs 1500, 1510 illustrate the dependence of communication protocol performance and system power usage on the clock frequency of the CPU core doing the spin-wait. As expected, higher polling frequency can reduce the average round-trip latency. Surprisingly, the optimal operating point, as defined by the Joules-per-IOP measure, was not found at the lowest core frequency. Dominated by the significant idle power consumption of the entire server, the energy cost of one read operation stays relatively flat at low clock settings, suggesting a cost-optimal operating point near 2 GHz for this configuration (1512) before accounting for hardware depreciation.

Note that the overall impact of target-initiated polling from the PCI Express target was found to be modest, about six percent of idle power consumption of the server. This is the worst case scenario where there is always a command request in flight, i.e. at queue depth 1 every other read of the command queue is guaranteed to be wasted. In this regime, fetching one 64 B command at a time would tie up less than six percent of upstream PCI Express bandwidth.

The communication protocol described herein improves performance of the widely adopted PCI Express interface, driven by the possibility of much higher performance frontiers uncovered by emerging non-volatile storage technologies. By eliminating unnecessary packet exchanges and avoiding context and mode switching, a prototype implementing the communication protocol was able to surpass 700,000 IOPS at queue depth 1 when reading, for example, from a PCM storage device on commodity hardware. The performance increases further for smaller transfers to just under a million reads per second, the hard limit set by bus and protocol latency. By increasing the number of PCI Express lanes or the per-lane bandwidth, in the future it can be possible to asymptotically approach this limit with larger transfers. Going even faster could require a fundamental change to the bus.

Unsolicited target-initiated polling of memory such as DRAM to check for presence of new read commands according to embodiments of the communication protocol can result in a reduction in average protocol latency, but at the expense of slightly higher idle power consumption. A prototype implementation indicates the worst-case impact can be modest, both on power consumption and on remaining PCI Express bandwidth.

In some embodiments, in settings with high load variability this component of overall power usage can be greatly mitigated ever further by, for instance, switching modes to use the communication protocol at a given load threshold, while reverting to a traditional "doorbell" and "completion" mode of operation at times of low load.

The communication protocol improves performance of small random reads, as one area in which PCM outperforms cheaper NAND flash. Write latency of the current generation of PCM can be about fifty-five times higher than read latency, so performance benefits may be expected to be small for modifying a corresponding write-side communication protocol aimed toward PCM. However, for new memory technologies with much lower write latencies, e.g. STT-MRAM, a similar revision to corresponding write-side communication protocols can be expected to result in similarly large round-trip latency improvements. Accordingly, the communication protocol is not limited to phase change memory and the PCI Express interface. Instead, the communication protocol is applicable to additional memory technologies accessed over additional interfaces.

The communication protocol improves on traditional host-side polling in various ways: the communication protocol introduces polling from both ends of the latency-limiting link, and does away with a separate completion signal in favor of low-latency polling on all atomic components of a compound transfer.

In some embodiments, the communication protocol can include implementing an additional protocol layer of negotiation through the kernel, such as Moneta Direct, to take advantage of low latency while still enjoying safety guarantees from the operating system.

The communication protocol casts PCM-based peripheral storage in a new light. Rather than using new memory technologies in a traditional fashion, like traditional spinning disks, the communication protocol can enable a new storage tier that fills a niche between DRAM and NAND flash. For example, the communication protocol can enable exposing very large non-volatile memory spaces that can still be read in-context with intermediate read latencies, but without the several Watts per gigabyte penalty of traditional DRAM refresh. On the other hand, treating PCM as block storage can alleviate the need to rethink the cache hierarchy of contemporary CPUs, which could otherwise be needed to achieve reasonable write performance in architectures where PCM is the main and only memory.

Beyond the communication protocol, almost an order of magnitude of further improvement in small random read latency is possible in principle before hitting the limits of underlying physics of phase change materials. Such advances could benefit either from use of parallel main memory buses together with deep changes to the cache hierarchy, or from use of fundamentally different high speed serial buses, such as HMCC, with shorter minimal transaction latencies. The latter, while promising, is still in the future, and is geared toward devices soldered onto motherboards as opposed to field-replaceable peripheral cards. It therefore appears that the niche for low read latency PCI Express peripheral storage based on Phase Change Memory is likely to persist until the arrival of future generations of peripheral buses and CPUs. It is this niche that embodiments of the communication protocol address.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this communications protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method of performing operations in a communications protocol, the method comprising:
    submitting, from a target in communication with a host via the communications protocol, a first command request for a first entry in a queue, wherein the first entry in the queue represents a first command inserted into the queue by the host, wherein the target submits the first command request without receiving, from the host, a first command availability signal prior to submitting the first command request and the first command availability signal indicates that the host has inserted the first command into the queue for processing by the target;
    submitting, from the target, a second command request for a second entry in the queue, wherein the second entry in the queue represents a second command inserted into the queue by the host, before receiving the first entry in the queue;
    receiving, by the target responsive to the first command request, the first entry in the queue, wherein the first received entry in the queue comprises the first command inserted into the queue by the host, and wherein the first command comprises a request for first data;
    executing, by the target, the first command to provide the requested first data, responsive to the received first entry in the queue, and processing a completion of the first entry in the queue without writing a first completion entry to a completion queue on the host and without generating an interrupt;

receiving, by the target responsive to the second command request, the second entry in the queue, wherein the second received entry in the queue comprises the second command inserted into the queue by the host, and wherein the second command comprises a request for second data; and executing, by the target, the second command to provide the requested second data, responsive to the received second entry in the queue.

2. The method of claim 1, further comprising:

determining that the target is capable of handling new commands; and wherein the second command request for the second entry in the queue is submitted after determining that the target is capable of handling new commands.

3. The method of claim 1, further comprising submitting the second command request before submitting the first command request; and wherein the second command request is received by the host before the first command request is received by the host.

4. The method of claim 3, further comprising receiving the second entry in the queue before receiving the first entry in the queue; and executing the second command before executing the first command.

5. The method of claim 1, wherein the operations in the communication protocol comprise read operations.

6. The method of claim 1, wherein the communication protocol includes commands with command formats compatible with the Non-Volatile Memory Express standard.

7. The method of claim 1, wherein the requested first data and requested second data is stored in a storage in communication with the target.

8. The method of claim 7, wherein the storage comprises at least one of a phase-change memory, magnetoresistive read only memory, and resistive read only memory.

9. A system for performing operations in a communications protocol, the system comprising:

a host in communication with a memory; and a target in communication with the host via the communication protocol, for transmitting a requested data;

wherein the target is configured to:

submit a first command request for a first entry in a queue, wherein the first entry in the queue represents a first command inserted into the queue by the host, wherein the target submits the first command request without receiving, from the host, a first command availability signal prior to submitting the first command request and the first command availability signal indicates that the host has inserted the first command into the queue for processing by the target;

submit a second command request for a second entry in the queue, wherein the second entry in the queue represents a second command inserted into the queue by the host, before receiving the first entry in the queue;

receive the first entry in the queue, wherein the first received entry in the queue comprises the first command inserted into the queue by the host, and wherein the first command comprises a request for first data;

execute the first command to provide the requested first data, responsive to the received first entry in the queue, and processing a completion of the first entry in the queue without writing a first completion entry to a completion queue on the host and without generating an interrupt;

receive the second entry in the queue, wherein the second received entry in the queue comprises the second command inserted into the queue by the host, and wherein the second command comprises a request for second data; and execute the second command to provide the requested second data, responsive to the received second entry in the queue.

10. The system of claim 9, the target is further configured to: determine that the target is capable of handling new commands; and wherein the second command request for the second entry in the queue is submitted after determining that the target is capable of handling new commands.

11. The system of claim 9, wherein the target is further configured to submit the second command request before submitting the first command request; and wherein the second command request is received by the host before the first command request is received by the host.

12. The system of claim 11, wherein the target is further configured to:

receive the second entry in the queue before receiving the first entry in the queue; and execute the second command before executing the first command.

13. The system of claim 9, wherein the operations in the communication protocol comprise read operations.

14. The system of claim 9, wherein the communication protocol includes commands with command formats compatible with the Non-Volatile Memory Express standard.

15. The system of claim 9, wherein the requested first data and request second data is stored in a storage in communication with the target.

16. The system of claim 15, wherein the storage comprises at least one of a phase-change memory, magnetoresistive read only memory, and resistive read only memory.

* * * * *